United States Patent
Koski et al.

(10) Patent No.: US 10,707,753 B2
(45) Date of Patent: Jul. 7, 2020

(54) POWER REGULATION WITH CHARGE PUMPS

(71) Applicant: Qualcomm Incorporated, San Diego, CA (US)

(72) Inventors: Marko Koski, Chandler, AZ (US); Charles Tuten, Scottsdale, AZ (US)

(73) Assignee: QUALCOMM Incorporated, San Diego, CA (US)

( * ) Notice: Subject to any disclaimer, the term of this patent is extended or adjusted under 35 U.S.C. 154(b) by 276 days.

(21) Appl. No.: 15/708,379

(22) Filed: Sep. 19, 2017

(65) Prior Publication Data
US 2019/0089244 A1    Mar. 21, 2019

(51) Int. Cl.
*H02M 3/07* (2006.01)
*G06F 1/26* (2006.01)
*H02M 7/00* (2006.01)

(52) U.S. Cl.
CPC ............ *H02M 3/073* (2013.01); *G06F 1/266* (2013.01); *H02M 3/07* (2013.01); *H02M 7/003* (2013.01)

(58) Field of Classification Search
CPC .. H02J 1/10; H02J 1/102; G06F 1/266; G06F 1/3203; G06F 1/3206; G06F 1/3287; G06F 1/3293; G06F 1/3296; H02M 3/156; H02M 3/157; H02M 3/07
See application file for complete search history.

(56) References Cited

U.S. PATENT DOCUMENTS

| | | | | |
|---|---|---|---|---|
| 6,396,137 B1* | 5/2002 | Klughart | ................. | H01L 25/16 257/691 |
| 6,657,875 B1* | 12/2003 | Zeng | ....................... | H02M 3/07 327/536 |
| 7,638,903 B2* | 12/2009 | Pelley, III | ................. | H02J 1/10 307/140 |
| 7,746,041 B2 | 6/2010 | Xu et al. | | |
| 8,125,263 B2* | 2/2012 | Wu | ....................... | H02M 3/073 327/536 |

(Continued)

FOREIGN PATENT DOCUMENTS

WO    2004066478 A1    8/2004

OTHER PUBLICATIONS

International Search Report and Written Opinion—PCT/US2018/050046—ISA/EPO—dated Feb. 28, 2019.

*Primary Examiner* — Gary L Laxton
(74) *Attorney, Agent, or Firm* — Colby Nipper/Qualcomm

(57) ABSTRACT

The present disclosure describes aspects of power regulation with charge pumps. In some aspects, an integrated circuit (IC) includes multiple processor cores and a power input connected to an internal power rail of the IC. The IC may also comprise embedded charge pumps coupled between the internal power rail of the IC and respective input power rails of the multiple processor cores. Capacitors of the embedded charge pumps may be implemented with on-die capacitors suitable for integration with a die of the circuit to facilitate the embedding of the charge pumps. Alternately or additionally, separate input power rails of the processor cores and the embedded charge pumps may enable more-efficient power regulation or power management on a per-processor core basis, such as when a processor core is throttled or idled to reduce power consumption.

30 Claims, 12 Drawing Sheets

(56) References Cited

U.S. PATENT DOCUMENTS

| | | | |
|---|---|---|---|
| 8,582,333 B2* | 11/2013 | Oraw | H02M 3/07 323/266 |
| 9,172,300 B2 | 10/2015 | Li et al. | |
| 2006/0139827 A1* | 6/2006 | Chun | G05F 1/56 361/90 |
| 2014/0167509 A1 | 6/2014 | Fernald | |
| 2014/0354258 A1 | 12/2014 | Thomsen | |

* cited by examiner

POWER REGULATION WITH CHARGE PUMPS

FIELD OF THE DISCLOSURE

This disclosure relates generally to power regulation circuitry, and more specifically to power regulation circuits comprising charge pumps.

BACKGROUND

This description of related art is provided for the purpose of generally presenting a context for the disclosure that follows. Unless indicated otherwise herein, concepts described in this section are not prior art to this disclosure and are not admitted to be prior art by inclusion herein.

Power regulation circuits of electronic devices typically regulate battery or external power of a device to provide a lower-voltage power rail from which components of the device operate. In some cases, current draw of high performance components (e.g., those with large current load steps) can cause voltage of the power rail to droop. This voltage droop on the power rail may persist or increase until the power regulation circuit detects the decline in voltage and responds by increasing power output to counter the voltage droop. The power regulation circuit, however, is often isolated from the high performance components, and voltage droop, by inherent impedance characteristics of the power rail and energy-storage components at the output of the power regulation circuit.

As such, a response of the power regulation circuit may be slow or insufficient, particularly for large current load steps that cause severe voltage droop. In some cases, prolonged or excessive voltage droop on the power rail may impair operations of the device's components or cause components to shut down when voltage falls below a minimum operating threshold. To address these issues, some manufactures have increased a number of power regulation circuits in a given device in an attempt to improve voltage droop response. These additional power regulation circuits, however, are often implemented with large or exotic magnetic components. In most cases, the use of these magnetic components makes design and integration of the additional power regulation circuits complex, time consuming, or cost-prohibitive.

SUMMARY

The present disclosure describes aspects of power regulation with charge pumps. In some aspects, an integrated circuit (IC) includes multiple processor cores and a power input connected to an internal power rail of the IC. The IC may also comprise embedded charge pumps coupled between the internal power rail of the IC and respective input power rails of the multiple processor cores. Capacitors of the embedded charge pumps may be implemented with on-die capacitors, for example suitable for integration with a die of the circuit to facilitate the embedding of the charge pumps. Alternately or additionally, separate input power rails of the processor cores and the embedded charge pumps may enable more-efficient power regulation or power management on a per-processor core basis, for example when a processor core is throttled or idled to reduce power consumption.

In some aspects of power regulation with charge pumps, an integrated circuit (IC) comprises a power input connected to an internal power rail of the IC and multiple processor cores that include a first processor core and a second processor core. The IC also comprises multiple charge pumps that include a first charge pump coupled between the internal power rail of the IC and a first input power rail of the first processor core, and a second charge pump coupled between the internal power rail of the IC and a second input power rail of the second processor core. The second input power rail of the second processor core is isolated from the first input power rail of the first processor core.

The IC may be disposed on an IC circuit die and one of the first charge pump or the second charge pump can be implemented with capacitors that are embodied on the IC die. In some cases, the capacitors of the first charge pump or the second charge pump are implemented as metal-insulator-metal capacitors, metal-on-metal capacitors, or metal-oxide-metal capacitors. A capacitance value of one of the capacitors may be within a range of approximately five nanofarads to 50 nanofarads. Alternately or additionally, the first charge pump or the second charge pump can be configured as a divide-by-two charge pump, a divide-by-three charge pump, or a divide-by-four charge pump.

The IC may be implemented without a power control switch disposed between the first charge pump and the first input power rail of the first processor core, or a power control switch disposed between the second charge pump and the second input power rail of the second processor core. The IC can also include a signal line coupled from the internal power rail of the IC to an external contact of the IC. In some cases, the IC further comprises a charge pump controller that includes an input coupled to the first input power rail of the first processor core or the second input power rail of the second processor core. In such cases, the charge pump controller may have an output coupled to first switch devices of the first charge pump or second switch devices of the second charge pump.

Alternately or additionally, the switch devices of the first charge pump or the second charge pump can be connected to a clock source of the IC that is configured to operate at a frequency of at least 200 megahertz. The first processor core or the second processor core may be implemented with low-voltage switching devices that are configured to operate from approximately 0.5 volts to 1.5 volts. In some cases, the first charge pump or the second charge pump is implemented with other low-voltage switching devices that are configured to operate from approximately 0.5 volts to 1.5 volts. The IC can be implemented as a system-on-chip, an application-specific integrated circuit, an application processor, a graphics processor, a memory controller, or a modem.

In other aspects, a printed circuit board assembly (PCBA) comprises a switching regulator that includes a first switch coupled between a power rail of the PCBA and a first terminal of an inductor of the switching regulator. The switching regulator also includes a second switch coupled between a lower potential of the PCBA and the first terminal of the inductor of the switching regulator, and a capacitor connected between a second terminal of the inductor and the lower potential of the PCBA. An integrated circuit (IC) of or embodied on the PCBA comprises an internal power rail coupled, via a power input node, to the second terminal of the inductor of the switching regulator. The IC also includes multiple processor cores that include a first processor core and a second processor core and multiple charge pumps. The multiple charge pumps comprise a first charge pump coupled between the internal power rail of the IC and a first input power rail of the first processor core, and a second charge pump coupled between the internal power rail of the IC and a second input power rail of the second processor core. The second input power rail of the second processor core is not coupled to the first input power rail of the first processor core.

The first charge pump may be connected directly from the internal power rail of the IC to the first input power rail of the first processor core, and the second charge pump is connected directly from the internal power rail of the IC to the second input power rail of the second processor core. In some cases, the IC is disposed on an IC die, and the first charge pump or the second charge pump is implemented with capacitors that are embodied on the IC die. A capacitance value of one of the capacitors may be within a range of approximately five nanofarads to 50 nanofarads. Alternately or additionally, the capacitors of the first charge pump or the capacitors of the second charge pump can be implemented as metal-insulator-metal capacitors, metal-on-metal capacitors, or metal-oxide-metal capacitors.

A first voltage of the first input power rail of the first processor core may be different from a second voltage of the second input power rail of the second processor core. A first frequency or first duty cycle at which the first charge pump is configured to operate can be different from a second frequency or second duty cycle at which the second charge pump is configured to operate. In some cases, the first processor core comprises a first digital load of the IC and the second processor core comprises a second digital load of the IC. In such cases, the IC may comprise a third digital load and a third charge pump coupled between the internal power rail of the IC and an input power rail of the third digital load of the IC. Alternately or additionally, the third digital load of the IC may comprise a third processor core, a graphics processing unit, a digital signal processor, a baseband modem, a communications processor, a memory controller, or a memory module. The PCBA can be embodied in a smart-phone, set-top box, cellular base station, access point, cellular phone, gaming device, navigation device, laptop computer, tablet computer, smart appliance, or vehicle-based communication system.

In yet other aspects, an integrated circuit (IC) comprises a power input connected to an internal power rail of the IC and multiple digital loads that each have a respective input power rail that is isolated from the input power rails of others of the multiple digital loads. The IC also comprises multiple charge pumps that are each coupled between the internal power rail of the IC and a respective one of the input power rails. Each of the multiple charge pumps includes a first pair of switches coupled in series between the internal power rail of the IC and the respective input power rail, and a second pair of switches coupled in series between the respective input power rail and a lower potential. Each of the multiple charge pumps also includes a first capacitor coupled from a common node of the first pair of switches to a common node of the second pair of switches, and a second capacitor coupled between the respective input power rail and the lower potential.

The IC may also comprise a signal line coupled between at least one of the respective input power rails and an external signal contact of the IC or package of the IC. In some cases, the IC comprises multiple signal lines coupled between at least two respective input power rails and at least two inputs of a multiplexer that has an output coupled to an external signal contact of the IC. One or more of the multiple charge pumps of the IC may operate in an open-loop control mode. Alternately or additionally, the IC may include a charge pump controller comprising an input coupled to at least one of the respective input power rails and a first output coupled to gates of the first pair of switches coupled to the at least one respective input power rail. The charge pump controller also includes a second output coupled to gates of the second pair of the switches coupled to the at least one respective input power rail.

In other aspects, an integrated circuit (IC) comprises a power input connected to an internal power rail of the IC and multiple processor cores that include a first processor core and a second processor core. Multiple charge pumps of the IC include a first charge pump coupled between the internal power rail of the IC and a first input power rail of the first processor core, and a second charge pump coupled between the internal power rail of the IC and a second input power rail of the second processor core. The IC also comprises means for monitoring a voltage of the first input power rail of the first processor core and means for altering, based on the voltage, operation of the first charge pump or the second charge pump to adjust the voltage of the first input power rail or the second input power rail.

The IC may also include means for monitoring an operative state of the first processor core or the second processor core, and means for altering, based on the operative state, operation of the first charge pump or the second charge pump to affect power provided to the first processor core or the second processor core. In some cases, the IC comprises means for monitoring an operative state of the first processor core or the second processor core, and means for suspending, based on the operative state, operation of the first charge pump or the second charge pump to idle the first processor core or the second processor core. Alternately or additionally, the means for monitoring the voltage may include multiplexing means for monitoring respective voltages of the first input power rail of the first processor core and the second input power rail of the second processor core.

The foregoing summary is provided to briefly introduce some of the aspects described herein. This summary is not intended to identify key or essential features of these or other aspects that are further described throughout the disclosure.

BRIEF DESCRIPTION OF DRAWINGS

The details of various aspects are set forth in the accompanying figures and the detailed description that follows. In the figures, the left-most digit of a reference number identifies the figure in which the reference number first appears. The use of the same reference numbers in different instances in the description or the figures may indicate like elements.

DETAILED DESCRIPTION

Figure 1:
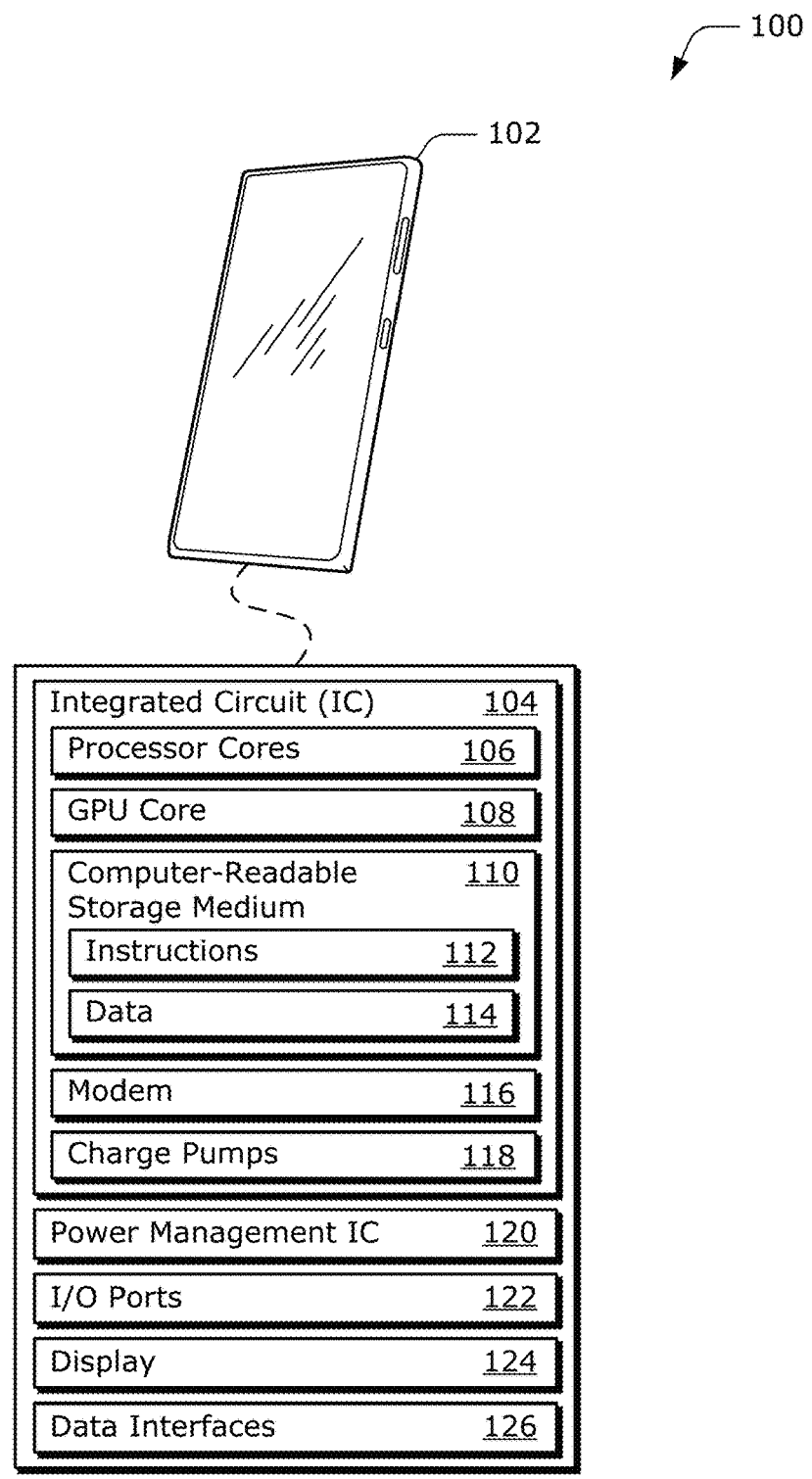
FIG. 1 illustrates an example environment that includes a computing device in which multi-stage power regulation can be implemented.

Conventional power regulation circuits often include single-stage direct current-to-direct current (DC-DC) switch-mode regulators that regulate battery or external power of a device to provide lower-voltage power rails (e.g., 3.3 volts, 1.8 volts, 1.1 volts) from which components of the device draw operating current. High current draw of some components, such as processors and modems, however, may exceed an amount of power being provided by the power regulation circuit and cause voltage of the power rail to droop. This voltage droop on the supply rail can be limited by impedance of the power regulation circuit's routing parasitics as much as by a transient response of the power regulation circuit. To mitigate the effects of the routing parasitics, another power regulation stage can be integrated within high performance components or digital loads.

In some cases, the additional stage of power regulation is implemented as another DC-DC switch-mode or buck regulator integrated within the high performance component or digital load. Switch-mode regulators, however, may regulate power using magnetic components that are larger than other types of components and not yet viable for mass production in a format suitable for in-chip or on-chip integration. As such, manufacture of these magnetics and integration of secondary switch-mode power regulation circuits is complex, time consuming, and may be cost-prohibitive.

In aspects of power regulation with charge pumps, charge pumps (e.g., a fractional charge pumps) of a power regulation circuit can be embedded with or within a high performance chip or digital load. By so doing, the effects of routing parasitics associated with an external supply (e.g., first stage) can be reduced, thereby improving transient load response of the power regulation circuit. Additionally, because these embedded charge pumps can be implemented with readily-fabricated or -available components (e.g., switches and capacitors) instead of complex magnetics, the charge pumps can be integrated with reduced design changes or cost increase. Further, an open-loop or unregulated charge pump can also manage or control power responsively and efficiently, further reducing design complexity of the power regulation circuit.

In some aspects, a charge pump is embedded within an integrated circuit having one or more processor cores. The integrated circuit may include a power input connected to a first power rail of the integrated circuit and a second power rail to which one of the processor cores is connected. The power input of the integrated circuit can be connected to an output of a first stage of power regulation, such as a DC-DC switch-mode regulator. An embedded charge pump may be connected between the first power rail and the second power rail to provide a second stage of power regulation for the processor core of the integrated circuit.

The charge pump may include a first pair of switches connected in series between the first power rail and the second power rail, and a second pair of switches connected in series between the second power rail and a lower potential. A first capacitor of the charge pump is connected from a common node of the first pair of switches to a common node of the second pair of switches. The charge pump may also include a second capacitor connected between the second power rail and the lower potential. In some aspects, first respective switches of the first and second switch pairs charge the first and second capacitors from the first power rail. Second respective switches of the first and second switch pairs then discharge the first and second capacitors to the second power rail, thereby providing power to the processor core of the integrated circuit.

By embedding charge pumps in the integrated circuit, a voltage at which power is provided to the integrated circuit can be increased, or approximately doubled when using a divide-by-two fractional charge pump. Due to resistive power loss ($I^2 \times R$) through power distribution network (e.g., power traces and planes) between the first power regulation stage and the integrated circuit, doubling the voltage of the power provided to the integrated circuit reduces power loss by a factor of four. This may also allow trace width and spacing of the power distribution network to be significantly reduced, thereby enabling more compact electrical assemblies and devices.

Within the integrated circuit, the charge pumps may drop the voltage of the power, such as by approximately half, to provide power to internal devices of the integrated circuit. In some cases, the charge pumps drop the incoming power from twice a core voltage level to the core voltage, at or proximate the core of the integrated circuit, thereby minimizing power losses and improving transient response of power regulation. Alternately or additionally, each core of the integrated circuit may be coupled to its own charge pump or charge pump array, which can prevent a loading of one core from affecting operating voltage of the other cores. In some aspects, the embedded charge pumps replace core block switches for the purposes of powering down individual cores or managing power characteristics of the individual cores. This can be effective to further reduce complexity, device count, or voltage overhead in core power management circuitry.

These and other aspects of power regulation with charge pumps are described below in the context of an example environment, example circuits, and techniques. Any reference made with respect to the example environment or circuits, or elements thereof, is by way of example only and is not intended to limit any of the aspects described herein.

Example Environment

FIG. 1 illustrates an example environment 100, which includes a computing device 102. In this example, the computing device 102 is implemented as a smart-phone. Although not shown, the computing device 102 may be implemented as any suitable computing or electronic device, such as a modem, cellular base station, broadband router, access point, cellular phone, gaming device, navigation device, media device, medical device, laptop computer, desktop computer, tablet computer, server, set-top box, network-attached storage (NAS) device, smart appliance, vehicle-based communication system, and the like. Alternately or additionally, components of the computing device 102 may be embodied on a printed circuit board assembly that resides in a chassis, body, or frame of the computing device 102.

The computing device 102 includes an integrated circuit 104 (IC 104), which may be configured as any suitable type of circuit or chip, such as an integrated circuit (IC), application-specific IC (ASIC) or system-on-chip (SoC). In this particular example, the IC 104 includes processor cores 106, a graphics processing unit core 108 (GPU core 108), and a computer-readable storage medium 110 (CRM 110). Although shown as a multi-processor-core IC, the IC 104 may alternately be implemented with a single processor core. The IC 104 may include any suitable number of processor cores 106, configured similarly or differently from each other.

For example, the processor cores 106 may be configured as a multi-core processor (e.g., hexa-core or octa-core processor) in which one of the cores has a maximum operating frequency, cache size, power consumption, or instruction set that differs from that of another processor core. Alternately or additionally, the processor cores 106 may have various operating states or power states that range from inactive to fully active, such as powered-down (e.g., mechanical off), deep-sleep, sleep, idle, active, performance, and so on. In each of these states, a voltage or clock frequency of a processor core may be adjusted or altered accordingly to accommodate a corresponding decrease or increase in processor activity. The processor cores 106 may be grouped or configured as any suitable type of processor, such as an application processor, configured to execute processor-executable code stored by the computer-readable storage medium 110.

The GPU core 108 may be configured to process visual-related data or graphical content for presentation or display to a user. In some cases, the GPU core 108 includes dedicated processing pipelines for rendering polygons, vectors, shading, ray traces, texture, and the like. The GPU core 108 may also have various operating states or power states that range from inactive to fully active, such as powered-down, sleep, idle, active, and so on. In each of these states, a voltage or clock frequency of the GPU core 108 may be adjusted accordingly to accommodate a corresponding decrease or increase in GPU core activity. For example, the voltage and clock frequency of the GPU core 108 may be reduced when the GPU core is throttled, idled, or in a sleep state (e.g., low-power state).

The CRM 110 stores information of the IC 104, such as data of the processor cores 106 and the GPU core 108. The CRM 110 may include any suitable type of data storage media, such as volatile memory (e.g., random access memory (RAM)), double-data-rate RAM (DRAM), static RAM (SRAM), non-volatile memory (read-only memory (ROM)), Flash memory, and the like. In the context of this disclosure, the CRM 110 is implemented to store instructions 112, data 114, and other information of the IC 104, and thus does not include transitory propagating signals or carrier waves.

A modem 116 of the IC 104 provides a digital communication interface for data, voice, messaging, and other applications of the IC 104. The modem 116 may include baseband circuitry to perform high-rate sampling processes that can include analog-to-digital conversion, digital-to-analog conversion, gain correction, skew correction, frequency translation, and the like. The modem 116 may also support multiple types of wireless communication and provide an interface with a radio frequency (RF) transceiver, RF front end, and antennas (not shown) of the computing device 102 to communicate via a wireless network or peer connection.

The IC 104 also includes charge pumps 118, which may provide operating power to components of the IC 104, such as the processor cores 106. In some cases, the charge pumps 118 are built into or fabricated on a die in which the IC 104 is embodied. For example, the charge pumps 118 may include low-voltage devices (e.g., switches) and metal-insulator-metal (MIM) capacitors, metal-on-metal (MoM) capacitors, or metal-oxide-metal (MOM) capacitors formed in or on the die of the IC 104. The implementation and use of the charge pumps 118 varies and is described further herein.

The computing device also includes a power management integrated circuit 120 (PMIC 120) for power regulation. The PMIC 120 can regulate external or internal power of the computing device 102 to provide regulated power for the IC 104 and other components of the computing device 102. In some cases, the PMIC 120 regulates power received from a battery or external supply of the computing device 102 to provide lower-voltage power rails for the IC 104 and the other components. The implementation and use of the PMIC 120 varies and is described further herein.

The computing device 102 may also include input/output ports 122 (I/O ports 122), a display 124, and/or data interfaces 126. The I/O ports 122 enable data exchanges or interaction with other devices, networks, or users. The I/O ports 122 may include serial ports (e.g., universal serial bus (USB) ports), parallel ports, audio ports, infrared (IR) ports, and the like. The display 124, when implemented natively, presents graphics of the computing device 102, such as a user interface elements rendered by the GPU core 108 and those associated with an operating system, program, or applications. Alternately or additionally, the display 124 may be implemented as a display port or virtual interface, through which graphical content of the computing device 102 is presented or transmitted by the computing device 102.

The data interfaces 126 provide connectivity to respective networks and other electronic devices connected therewith. The data interfaces 126 may comprise wired data interfaces, wireless data interfaces, or any suitable combination thereof. Example wired data interfaces of the computing device 102 include Ethernet, USB-based, or fiber optic interfaces for communicating over a local network, intranet, or the Internet. Alternately or additionally, the computing device 102 may include wireless interfaces communicate over a wireless network, such as a wireless LAN, peer-to-peer (P2P), cellular network, and/or wireless personal-area-network (WPAN). In such cases, the wireless interfaces may be implemented separately from, or through, the modem 116 and other RF circuitry of the IC 104.

Figure 2:
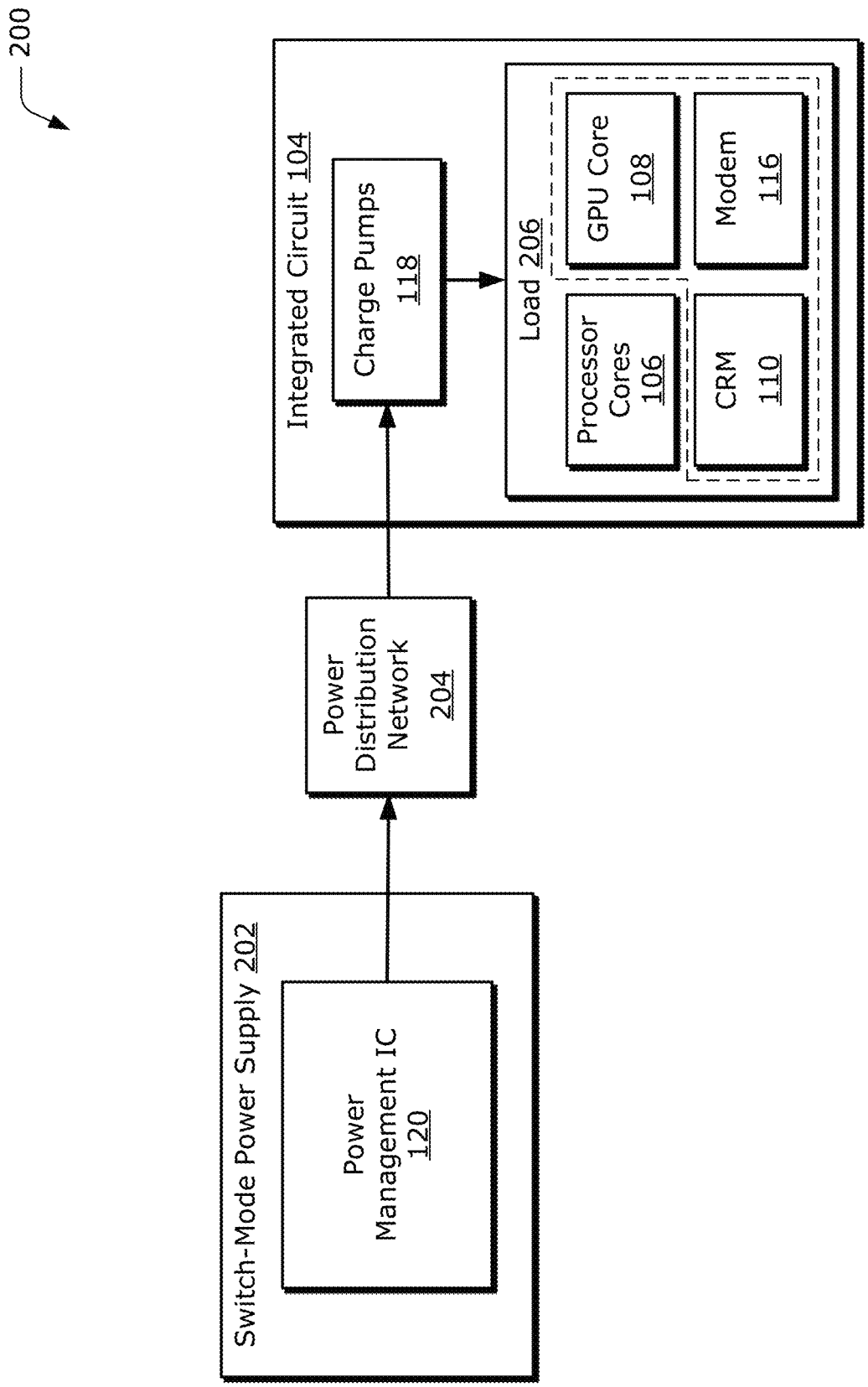
FIG. 2 illustrates an example configuration of power regulation components including the charge pumps of FIG. 1.

FIG. 2 illustrates an example configuration of the charge pumps 118 and a PMIC 120 generally at 200. In this example, the PMIC 120 is implemented as part of a power regulation stage that includes a switch-mode power supply 202 (SMPS 202). This power regulation stage may be a first stage configured to regulate battery or external power of the computing device 102, or an intermediate power regulation stage that receives power from a first or other power regulation stage. In some cases, the PMIC 120 controls or drives switching devices of the SMPS 202 to provide regulated power at a particular voltage level. The switch-mode power supply 202 may be implemented as a buck converter that decreases voltage of source power (e.g., input power), or boost converter that increases voltage of the source power, or a combination boost-buck converter. In some aspects, the PMIC 120 includes the switch-mode power supply or elements thereof instead of being included within the SMPS 202.

An output of the switch-mode power supply 202 is connected to a power distribution network 204. The power distribution network 204 distributes regulated power to components or modules of the computing device 102, such as the IC 104. In some cases, the power distribution network 204 includes conductive (e.g., copper) traces or portions of conductive planes of a printed circuit board (PCB). These conductors of the power distribution network 204 may include or introduce routing parasitics that affect an ability of the SMPS 202 to respond to transient load steps. Alternately or additionally, the power distribution network 204 may include filtering or suppression components, such as capacitors or ferrites, to mitigate noise or interference in the power distribution network 204.

In this example, the charge pumps 118 of the integrated circuit 104 receive power from the switch-mode power supply 202 via the power distribution network 204. The charge pumps 118 can be configured as a second or final power regulation stage that regulates the power provided by the switch-mode power supply 202. The charge pumps 118 regulate the power received from the power distribution network 204 to provide power at a suitable voltage for a load 206 of the IC 104. To reduce a voltage of power received from the switch-mode power supply 202, the charge pumps 118 may be configured as fractional charge pumps that reduce the voltage of IC 104 input power by a factor of approximately one half, one third, on fourth, and so on.

The load 206 that receives power from the charge pumps 118 may include any suitable type of component or block of the IC 104, such as a processor core, graphics processing unit (GPU), communications processor, digital signal processor (DSP), media encoder or decoder, and the like. In this example, the load 206 connected to the charge pumps 118 includes the processor cores 106, which may be implemented as cores of an application processor. As shown in FIG. 2, the load 206 of the charge pumps 118 may also include the GPU core 108, CRM 110, and modem 116 of the IC 104. Each of these components or blocks of the IC 104 may receive partial or full operating power from the charge pumps 118. One or more of the cores in the load 206 may be associated with and/or receive power from a respective charge pump of the charge pumps 118, as will be described below.

Figure 3:
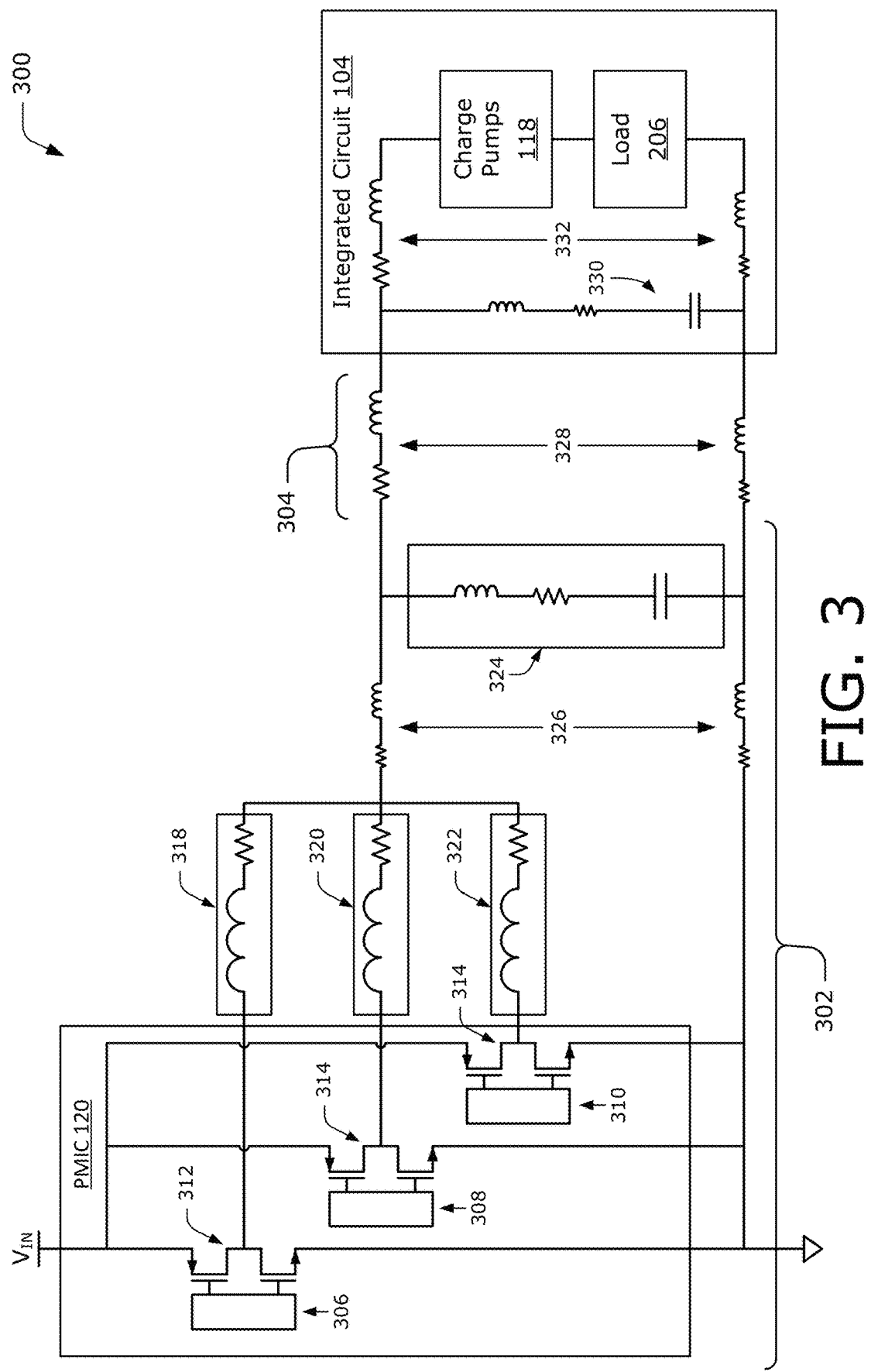
FIG. 3 illustrates an example power regulation circuit and power distribution network.

FIG. 3 illustrates an example power regulation circuit and power distribution network generally at 300. Aspects will be described in reference to two-stage power regulation and a multi-phase switching regulator, but the aspects and techniques herein may be applied to other types of power supplies or power regulation topologies, such as multi-stage power regulation, single-phase switching regulators, boost converters, linear regulators, battery charging systems, and so on. Further, signal- or current-carrying structures of the circuits may be implemented as any suitable type of conductor, such as wires, printed-circuit board (PCB) traces, etched metal layers, planes, contacts, nets, paths, rails, and the like. The use of these terms is not meant to limit a configuration of any circuit, but to provide context for describing the circuits of the accompanying figures.

As shown in FIG. 3, a first stage of power regulation is provided by a multi-phase switch-mode power supply 302 (multi-phase SMPS 302). The multi-phase SMPS 302 may be implemented similar to, or differently from, the SMPS 202 as described with reference to FIG. 2. In this example, the multi-phase SMPS 302 is implemented as a three phase SMPS that provides power to the IC 104 via a power distribution network 304. Logic and control functionalities of the multi-phase SMPS 302 are provided by an instance of a PMIC 120, which is configured as a controller of the multi-phase SMPS 302 and/or is configured to include all or part of the SMPS 302. Here, the PMIC 120 controls operation of buck switch drivers 306, 308, and 310 of the multi-phase SMPS 302, which in turn drive integrated buck switch stacks 312, 314, and 316, respectively.

Each of the buck switch stacks 312, 314, and 316 includes a high-side switch connected to a power input (e.g., power rail) of the multi-phase SMPS 302 and a low-side switch connected to a lower potential or ground. In other cases, a buck switch or boost switch of the multi-phase SMPS 302 can be implemented as an external switch having a gate connected to a drive pin of the PMIC 120. Alternately or additionally, the PMIC 120 may drive the buck switch stacks 312, 314, and 316 in an interleaved fashion (e.g., 120 degrees out of phase) to reduce input ripple current or output ripple current of the multi-phase SMPS 302.

Respective switch nodes of the integrated buck switch stacks 312, 314, and 316 are each connected to a corresponding one of inductors 318, 320, and 322 of the multi-phase SMPS 302. As shown in FIG. 3, the inductors 318, 320, and 322 are modeled with inductance and equivalent series resistance (ESR), which may affect current flowing through and voltage across the inductor. The inductors 318, 320, and 322 are connected to a bulk/filter capacitor 324 at the output of the multi-phase SMPS 302. The bulk/filter capacitor 324 may represent any suitable number, combination (respective types or capacitances), or network of capacitors connected to the output of the multi-phase SMPS 302, such as to provide bulk capacitance and/or filtering capacitance. The inductors 318, 320, and 322 and bulk/filter capacitor 324 of the multi-phase SMPS 302 are connected via traces or interconnects that include parasitic impedance 326, which may include parasitic resistance and parasitic inductance.

The bulk/filter capacitor 324 of the multi-phase SMPS 302 can be modeled with a respective capacitance and non-ideal impedances, which may include equivalent series inductance (ESL) and equivalent series resistance (ESR). In some cases, these equivalent impedances of the bulk/filter capacitor 324 affect a current flow or voltage of the capacitors. The output of the multi-phase SMPS 302 is connected to the IC 104 by the power distribution network 304, which may include any suitable combination of traces, planes, or interconnects. Alternately or additionally, the power distribution network 304 can include other power conditioning or power control components, such as ferrites, diodes, fuses, switches, and the like.

In this particular example, parasitic impedance 328 of the power distribution network 304 is modeled as parasitic resistance and parasitic inductance. In some cases, this parasitic impedance 328 affects an ability of, or efficiency at which, the multi-phase SMPS 302 provides power to a load, such as the IC 104. For example, power flowing through the power distribution network 304 may incur current-related power loss of $I^2 \times R$ due to the parasitic resistance, which can be decreased by increasing a voltage of power provided by the multi-phase SMPS 302 in accordance with aspects described herein. The power distribution network 304 may be formed with any suitable combination of power traces, planes, or interconnects configured to distribute the power of the multi-phase SMPS 302 to the IC 104 and other components of the computing device 102. In accordance with some aspects, routing dimensions of these traces or planes can be reduced due to an increase in voltage and reduction in current of the power provided to a second stage of power regulation (e.g., the charge pumps 118 of the IC 104).

The power distribution network 304 provides the power regulated by the multi-phase SMPS 302 to the IC 104. In some cases, the IC 104 includes an internal capacitance 330 and parasitic impedance 332. This internal capacitance 330 may include a combination of routing capacitance formed between conductive structures of the IC 104 or other capacitors, such as land-side capacitors or on-die capacitors integrated into a chip or packaging of the IC 104. Alternately or additionally, the parasitic impedance 332 may comprise parasitic resistance and parasitic inductance associated with power distribution rails or networks of the IC 104. As with other routing or distribution parasitics, power losses associated with the parasitic impedance 332 of the IC 104 can further decrease voltage of power provided to the IC 104 by a first power regulation stage.

In some aspects, the multi-phase SMPS 302 provides, as a first stage of power regulation, power through the power distribution network 304 to the IC 104 at a voltage that is a multiple of an input voltage of the load 206. By increasing the voltage of power transmitted through the power distribution network 304, losses associated with routing and other parasitics (e.g., parasitic impedances 326, 328, and 332) can be reduced relative to conventional power supply architectures. In some cases, providing power at double or triple the load voltage reduces the losses by a factor of four or nine, respectively, due to the non-linear relationship of the $I^2 \times R$ losses throughout the power distribution network.

The charge pumps 118 of the IC 104 can reduce, as a second stage of power regulation, the voltage to approximately the input voltage of the load 206 within the IC 104, thereby minimizing losses and inefficiencies associated with the power distribution network 304 and other interconnects. Additionally, having a second stage proximate or co-located with the load 206 may also improve transient response of the power regulation system to current load steps, such as those of high performance digital loads.

Figure 4:
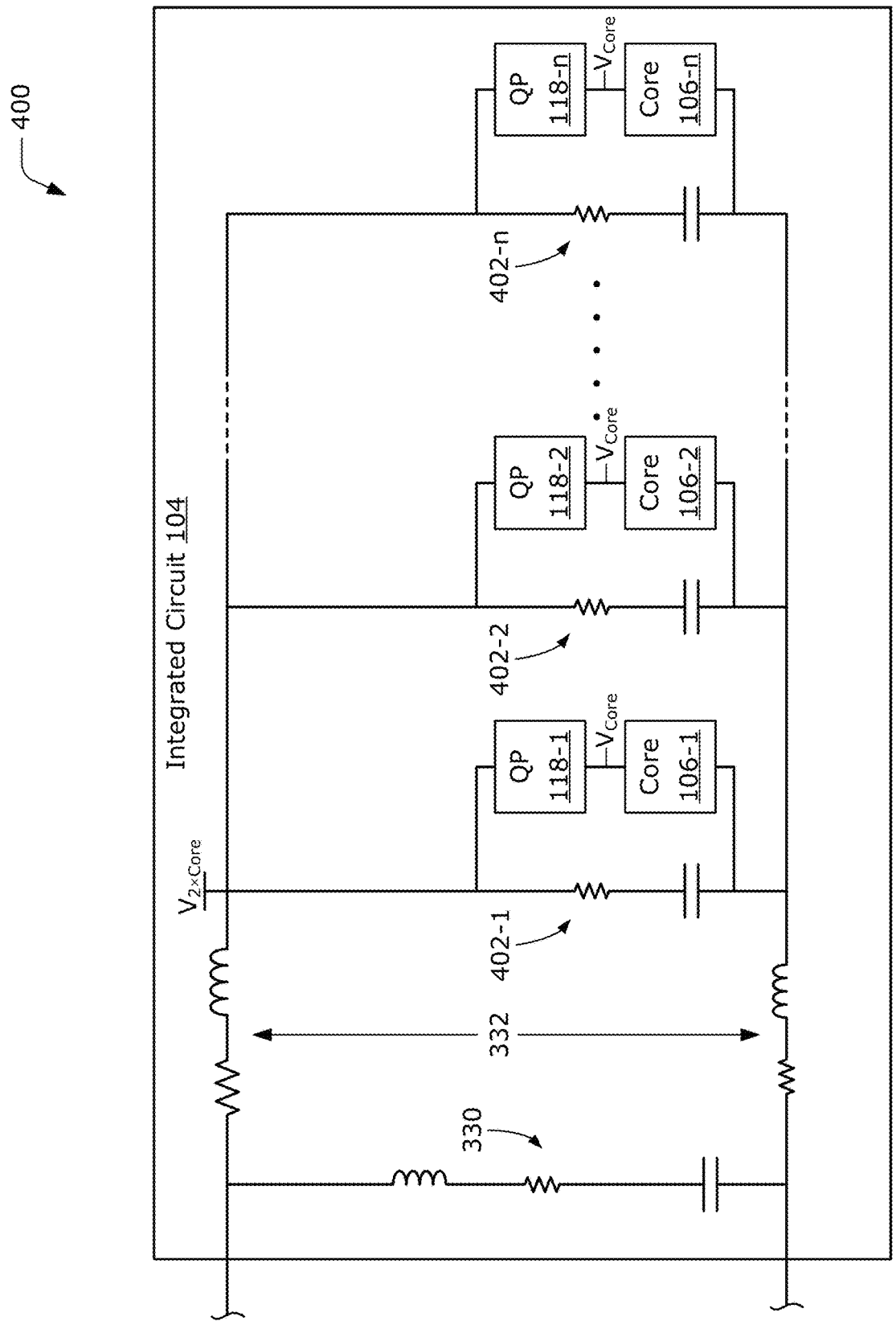
FIG. 4 illustrates an example multi-core integrated circuit that includes embedded charge pumps.

FIG. 4 illustrates an example configuration of an integrated circuit 104 generally at 400 that includes embedded charge pumps and multiple processor cores (e.g., multi-core processor). This instance of the IC 104 may be configured similar to, or differently from, other integrated circuits described herein. For example, the IC 104 includes internal capacitance 330 and parasitic impedance 332 as described with reference to FIG. 3. The IC 104 may also include capacitors on a die of the IC 104 or capacitors coupled to packaging in which the IC 104 is embodied, such as land-side or die-side capacitors soldered to a chip package or substrate supporting IC 104. These capacitors may be connected to a core power rail of the IC 104 to provide on-chip filtering or bulk capacitance.

In some aspects, the charge pumps 118 are implemented as a second or final stage of a multi-stage power regulation system. As such, the charge pumps 118 may receive power from any suitable type of upstream power supply or regulator, such as an SMPS, multiphase SMPS, buck converter, boost converter, linear regulator, other charge pumps, and so on. The charge pumps 118 may be configured as fractional charge pumps that provide power at a voltage that is a fraction of voltage at which the charge pumps receive power. For example, a divide-by-two charge pump can provide power with voltage that is approximately half of an input voltage, a divide-by-three charge pump can provide power with voltage that is approximately a third of an input voltage, and so on. Thus, a topology of the charge pumps 118 may be selected or configured to provide a desired step-down of input voltage.

In this particular example, the IC 104 includes multiple charge pumps (QPs) 118-1, 118-2, through 118-$n$ to provide power to respective processor cores (cores) 106-1, 106-2, through 106-$n$, where n is any suitable number. Additionally, each of the charge pumps 118 may represent any suitable number of individual charge pumps connected in parallel to provide power to a respective load or core of the IC 104. The IC 104 may also include capacitance 402-1, 402-2, through 402-$n$ (shown with ESR) in parallel with a respective instance of a charge pump 118 and processor core 106-1. In some cases, this capacitance 402 is internal or inherent capacitance formed by a combination of metallic and non-metallic routing, structures, and/or layers of the IC 104. Alternately or additionally, the capacitance 402 may include on-die capacitors, die-side capacitors, or land-side capacitors coupled to packaging of the IC 104.

In the context of this example, the charge pumps 118-1, 118-2, through 118-$n$ are implemented as divide-by-two charge pumps, which drop a voltage of an input power rail by approximately half to provide power at an output of the charge pumps. As shown in FIG. 4, the IC 104 receives power at approximately twice a core voltage ($V_{2 \times Core}$) specified for the processing cores 106-1, 106-2, through 106-$n$. The charge pumps 118-1, 118-2, through 118-$n$, configured as divide-by-two charge pumps, regulate the incoming power to provide power at approximately half of the input voltage, or at approximately the core voltage specified ($V_{Core}$) for of the processing cores 106-1, 106-2, through 106-$n$. Alternately or additionally, an operating frequency or duty cycle of one of the charge pumps 118-1, 118-2, through 118-$n$ may be altered or adjusted to provide power at a different voltage level, such as less than half of the input voltage. This can be useful to provide power at lower voltage when throttling or idling one or more of the cores 106-1, 106-2, through 106-$n$.

Figure 5:
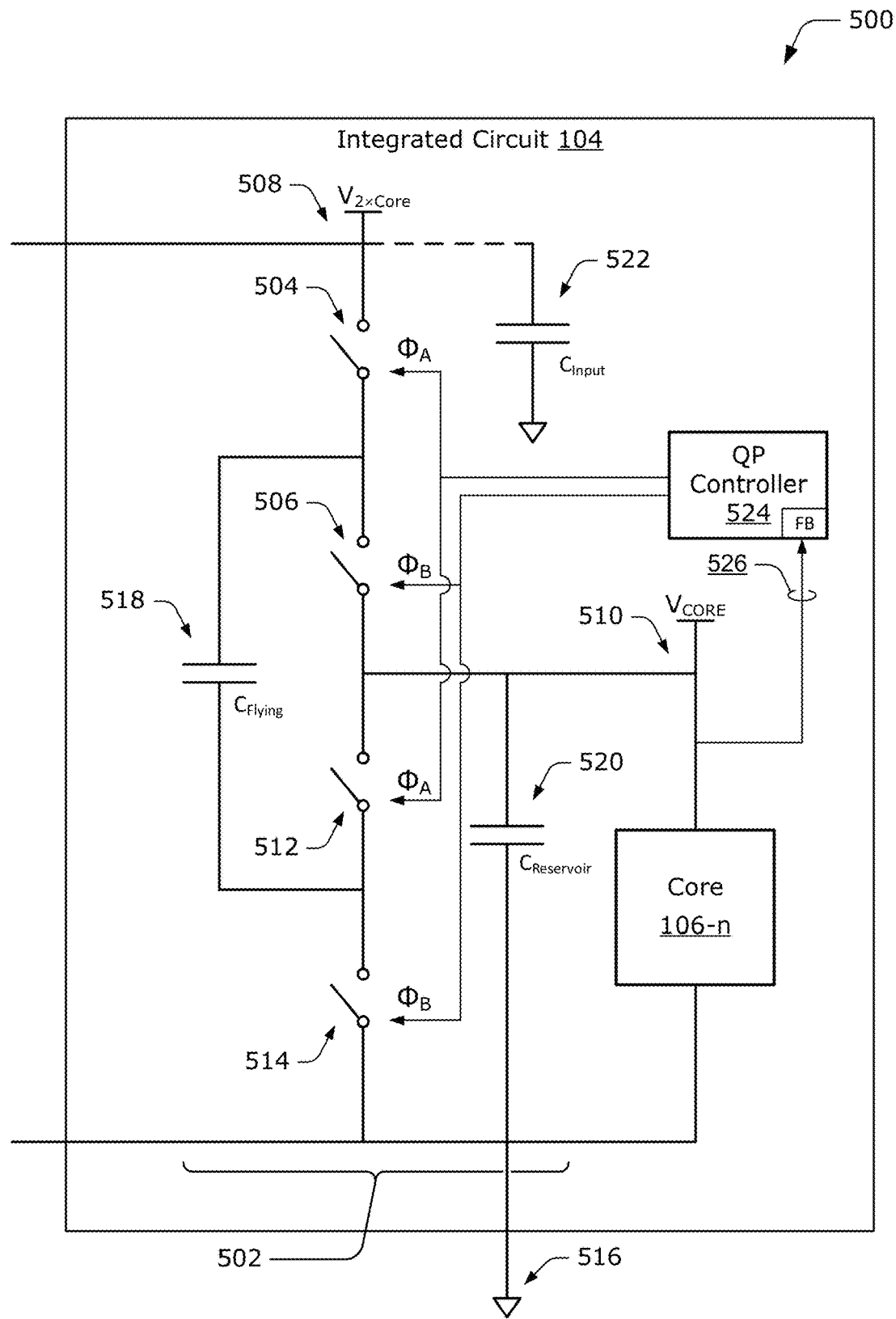
FIG. 5 illustrates an example embedded charge pump implemented in accordance with one or more aspects.

FIG. 5 illustrates an example embedded charge pump implemented in accordance with one or more aspects at 500. In this example, a charge pump 502 is implemented as a divide-by-two charge pump having two energy storage devices capable of being connected in series or in parallel during various states of operation. Although described with reference to a divide-by-two topology, the aspects described herein may be implemented with any suitable charge pump topology, such as divide-by-three, divide-by-four, or up to a divide-by-n topology, where n is any suitable number. Alternately or additionally, an integrated circuit may include charge pumps having different topologies or configured to provide respective power at different fractional reductions of input voltage.

In this example, the charge pump 502 includes a first pair of switches 504, 506 connected between a first power rail 508 and a second power rail 510 of the IC 104. In some cases, the first power rail 508 is an input power rail or connected to a power input node of the IC 104 and the second power rail 510 is connected to a processor core (e.g., as a core power rail) or a digital load of the IC 104. The charge pump 502 also includes a second pair of switches 512, 514 connected between the second power rail 510 and a lower potential 516 (e.g., ground). A flying capacitor 518 of the charge pump 502 is connected between a common node of the first pair of switches 504, 506, and a common node of the second pair of switches 512, 514. A reservoir capacitor 520 of the charge pump 502 is connected between the second power rail 510 and the lower potential 516. Alternately or additionally, the charge pump 502 may also include an input capacitor 522 connected proximate a connection of the switch 504 to the first power rail 508.

The switches 504, 506, 512, and 514 of the charge pump 502 may be implemented using any suitable switching device, such as N-channel metal-oxide-semiconductor field-effect transistors (n-MOSFETs or nFETs) or P-channel MOSFETs (pFETs). In some cases, these switching devices are low-voltage (LV) devices from which a core or digital load of the IC 104 is embodied. In such cases, these devices may operate with a lower voltage overhead (e.g., 0.5 volts to 1.5 volts) than input/output (I/O) devices of the IC 104 or be fabricated with, or through a process similar to, the LV devices of the processor cores of the IC 104. As such, the switching devices of the charge pump 502 and other charge pumps 118 can be easily scaled with the fabrication process associated with forming other LV devices of the IC 104.

The flying capacitor 518, reservoir capacitor 520, or input capacitor 522 of the charge pump 502 may be implemented as any suitable type of capacitor, such as metal-insulator-metal (MIM) capacitors, metal-oxide-metal (MOM) capacitors, metal-on-metal (MoM) capacitors, and the like. In some cases, the capacitors of the charge pump are implemented as on-die capacitors, formed by metallic and non-metallic (insulative) structures on an IC die, embedded within an IC die, embedded within a substrate on which a die is embodied, and the like. In such cases, placement or implementation of the capacitors on-die provides capacitor with low equivalent series inductance (ESL) (e.g., less than 100 picohenries). These low ESL on-die capacitors may enable the charge pump 502 to operate at higher frequencies, transfer significant amounts of energy, and/or achieve lower output impedance, any or all of which can improve an embedded charge pump's ability to respond to transient load steps (e.g., minimize voltage droop).

The capacitors of the charge pump 502 may also be implemented with any suitable respective capacitance values. In some cases, the flying capacitor 518, reservoir capacitor 520, or input capacitor 522 are implemented with respective capacitance values of approximately five nanofarads to 50 nanofarads. For example, a capacitance of the flying capacitor 518 may be 20 nanofarads, a capacitance of the reservoir capacitor 520 may be 25 nanofarads, and a capacitance of the input capacitor 522 may be five nanofarads. Alternately or additionally, any of the capacitors may be implemented over a wider range of capacitance, such as one nanofarad to 100 nanofarads or greater, to accommodate various configurations of the charge pump 502, charge pumps 118, or load 206 of the IC 104.

In some aspects, operation of the switches 504, 506, 512, and 514 of the charge pump 502 is managed by a charge pump controller 524 (QP controller 524) of the IC 104. The charge pump controller 524 includes outputs or gate drivers connected, either directly or branched, to gates of the switches 504, 506, 512, and 514. The charge pump controller 524 can close pairs of the switches in different phases to enable operation of the charge pump 502. For example, when the charge pump controller 524 closes switches 504 and 512 during an A phase ($\Phi_A$), the flying capacitor 518 and reservoir capacitor 520 are connected in series to the first power rail 508 in order to charge up to approximately the input voltage. When the charge pump controller closes switches 506 and 514 during a B phase ($\Phi_B$), the flying capacitor 518 and reservoir capacitor 520 are connected in parallel to discharge to the second power rail 510 at approximately half a voltage of the first power rail 508.

The charge pump controller 524 may enable any suitable mode of charge pump operation or function, such as open-loop operation, closed-loop operation, voltage regulation, core idling, core power control, and the like. In some cases, such as for open-loop operation, the charge pump controller 524 may be implemented with, based on, or similar to a clock generator that is configurable to generate a clock signal by which the charge pump 502 operates. For example, the charge pump controller 524 can be configured to generate complimentary switch control signals (e.g., phases A and B) at a frequency of approximately 100 MHz to 750 MHz. Alternately or additionally, charge pump control signals may be generated based on an internal clock of the IC 104, such as by buffering or dividing other IC or processor core clock signals to provide switch control signals for the switches 504, 506, 512, and 514 of the charge pump 502.

In some aspects, the charge pump controller 524 includes an input by which a feedback signal 526 is received. The feedback signal 526 may indicate any suitable voltage, such as voltage of a second power rail of the IC 104, voltage of a processor core power rail, voltage of a processor core, voltage at an output of the charge pump 502, and so on. Based on the feedback signal 526, the charge pump controller 524 may implement closed-loop control of the charge pump 502. By so doing, the charge pump controller 524 can adjust or alter a voltage at which power is provided by the charge pump 502, such as to reduce voltage of a processor core or control application of power to the processor core. For example, the charge pump controller 524 can reduce the voltage of power provided to a processor core when the core is throttled (e.g., down-clocked) or remove power from a processor core that is idled, put in a sleep state, or powered down.

Figure 6:
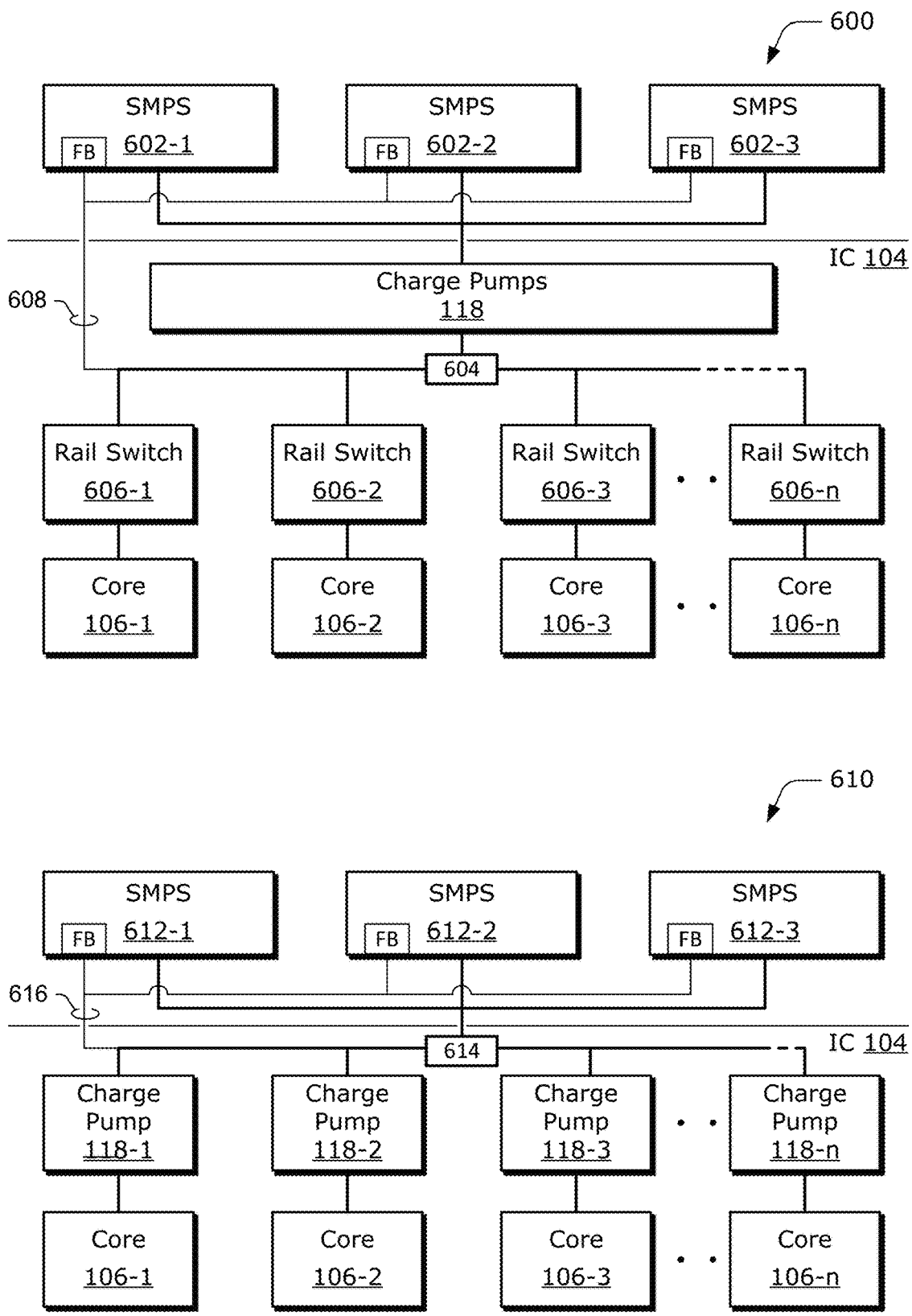
FIG. 6 illustrates example configurations of charge pumps capable of implementing aspects of power regulation with charge pumps.

FIG. 6 illustrates example configurations of charge pumps and other components capable of implementing aspects of two-stage or other multi-stage power regulation. A first example configuration 600 includes switch-mode power supplies 602-1, 602-2, and 602-3 configured as a multi-phase switch-mode power supply to provide power to IC 104. In this example, the charge pumps 118 of the IC 104 are implemented as a common or universal step down power stage that provides power to a power rail 604 (e.g., internal power rail) of the IC 104. The power rail of the IC 104 may include any suitable type of power rail, such as a processor core power rail, graphics core power rail, modem power rail, memory power rail, and the like.

To control distribution of power from the power rail 604, a rail switch 606 can be interposed between the power rail 604 and a processor core 106 of the IC 104. As shown in FIG. 6, the IC 104 includes rail switches 606-1, 606-2, 606-3, through 606-$n$ connected to respective processor cores 106-1, 106-2, 106-3, through 106-$n$, where n is any suitable number (e.g., 4, 8, or 16). These rail switches 606-1, 606-2, 606-3, through 606-$n$ may enable core-specific power management and control, such as the idling or powering down of individual processor cores 106.

In some cases, a feedback signal line 608 is connected from the power rail 604 to feedback inputs of the switch-mode power supplies (e.g., PMIC 120) to enable regulation of voltage at the power rail 604 and thus the processor cores 106 of the IC 104. Due to the fractional voltage reduction provided by the charge pumps 118 (e.g., ½ $V_{Input}$), a PMIC 120 of the switch-mode power supplies 602-1, 602-2, and 602-3 may regulate a voltage of the IC 104's power rail based on a fractional or linear relationship of voltage provided by the switch-mode power supplies (e.g., $2 \times V_{Core}$) and the fractional voltage reduction of the charge pumps 118 (e.g., $V_{Core}$). Alternately or additionally, the charge pumps 118 may operate in an open-loop control mode by which the charge pumps 118 are able to quickly respond to current load steps of the processor cores 106.

A second example configuration 610 includes switch-mode power supplies 612-1, 612-2, and 612-3 configured as a multi-phase switch-mode power supply to provide power to IC 104. In this example, the charge pumps 118 of the IC 104 are implemented as separate or dedicated charge pumps to step down power received from a power rail 614 (e.g., internal power or voltage rail) that is connected to the multi-phase switch-mode power supply. To control or manage the distribution of power, the charge pumps 118-1, 118-2, 118-3, through 118-n are connected between the power rail 614 and respective processor core 106-1, 106-2, 106-3, through 106-n, where n is any suitable number (e.g., 4, 8, or 16). As such, these charge pumps 118-1, 118-2, 118-3, through 118-n may enable core-specific power management and control, such as the idling or powering down of individual processor cores 106. The charge pumps 118 can, via internal switches, replicate the functionalities of the rail switches 606 (e.g., block head switches), and thus may replace the rail switches to enable an IC to be implemented with fewer devices or less complexity.

In some aspects, a feedback signal line 616 is connected from the power rail 604 to feedback input (e.g., FB node) of the switch-mode power supplies (e.g., PMIC 120) to enable regulation of voltage at the power rail 614 and thus the fractional voltage of power provided to the processor cores 106 of the IC 104. Due to the fractional voltage reduction provided by the charge pumps 118, a PMIC 120 of the switch-mode power supplies 612-1, 612-2, and 612-3 may regulate a voltage of the IC 104's power rail based on a fractional or linear relationship of voltage provided by the switch-mode power supplies and the fractional voltage reduction of the charge pumps 118. Alternately or additionally, the charge pumps 118 may operate in an open-loop control mode by which the charge pumps 118 are able to quickly respond to current load steps of the processor cores 106.

Figure 7:
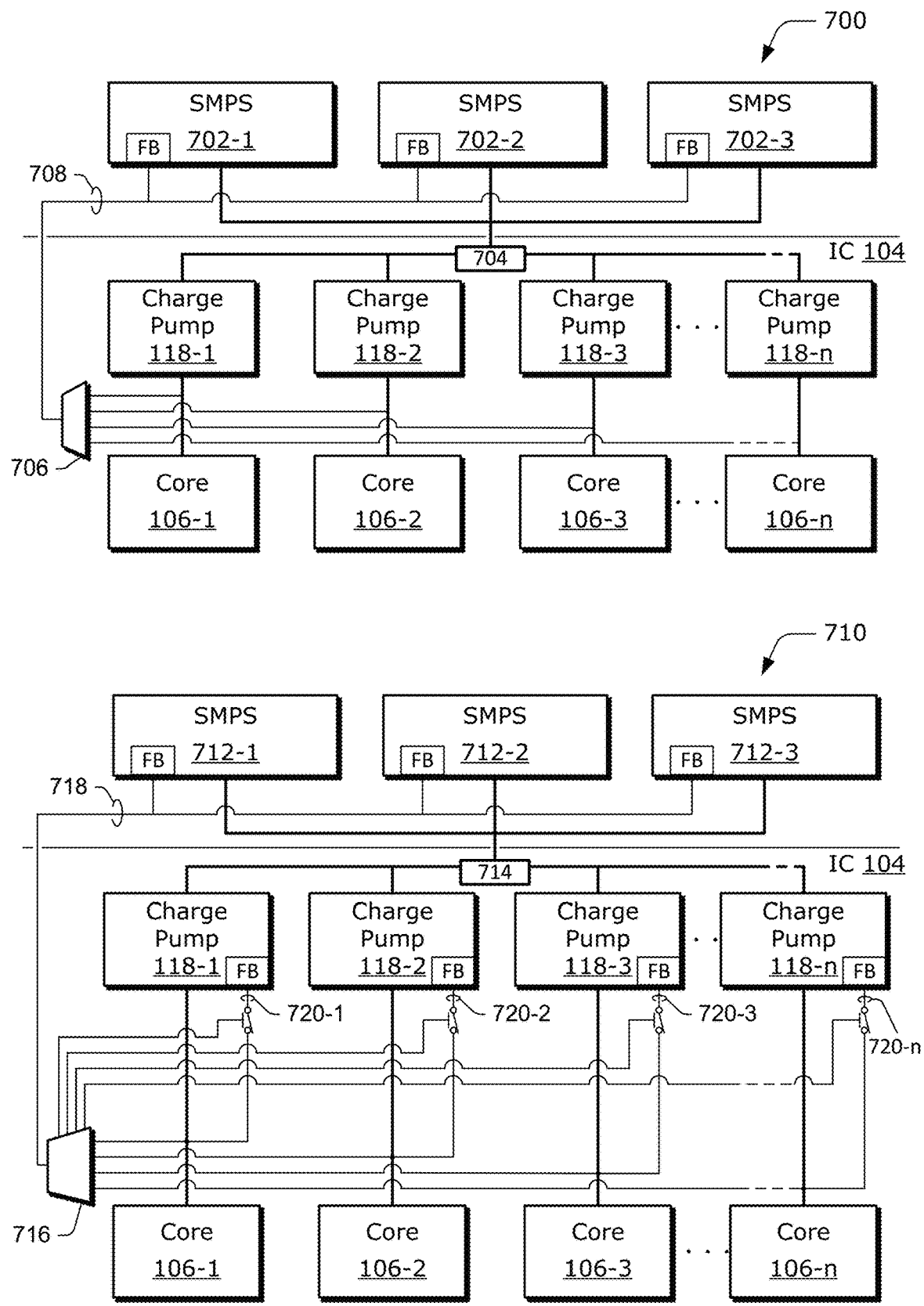
FIG. 7 illustrates other example configurations of charge pumps capable of implementing aspects of power regulation with charge pumps.

FIG. 7 illustrates additional example configurations of charge pumps and other components capable of implementing aspects of power regulation with charge pumps. A first example configuration 700 includes three switch-mode power supplies 702-1, 702-2, and 702-3 configured as a multi-phase switch-mode power supply to provide power to IC 104, though any number of SMPSs may be used. In this example, the charge pumps 118 of the IC 104 are implemented as separate or dedicated charge pumps to step down power received from a power rail 704 (e.g., internal power rail) that is connected to the multi-phase switch-mode power supply.

To control or manage the distribution of power, the charge pumps 118-1, 118-2, 118-3, through 118-n are connected between the power rail 704 and a respective power rail for each processor core 106-1, 106-2, 106-3, through 106-n, where n is any suitable number (e.g., 4, 8, or 16). As such, these charge pumps 118-1, 118-2, 118-3, through 118-n may enable core-specific power management and control, such as the idling or powering down of individual processor cores 106. In some cases, the charge pumps 118 are able to replicate the functionalities of the rail switches 606 (e.g., block head switches), and thus may replace the rail switches to enable an IC to be implemented with fewer devices or less complexity.

In this particular example, the IC 104 also includes a multiplexer 706 to provide a feedback signal 708 to respective feedback inputs of the switch-mode power supplies (e.g., PMIC 120). The inputs of the multiplexer 706 are connected to respective outputs of the charge pumps 118-1, 118-2, 118-3, through 118-n and may receive an indication of voltage provided to each of the processor cores 106-1, 106-2, 106-3, through 106-n. In some aspects, this enables regulation of voltage on a per-core basis, such as by regulating voltage based on a core voltage or top of a lowest voltage processor core. In such cases, the multiplexer 706 may be used to sample or monitor each core voltage (or QP output) and enable adjustments to voltage of the power provided by the SMPSs such that a desired core voltage is maintained (e.g., at a lowed core). In some cases, frequency or duty cycle of an one or more charge pumps may also be altered to reduce or control voltage of power provided to one or more cores, respectively. Due to the fractional voltage reduction provided by the charge pumps 118, a PMIC 120 of the switch-mode power supplies 702-1, 702-2, and 702-3 may regulate a voltage of power provided to the power rail 704 based on a fractional or linear relationship of voltage provided and the fractional voltage reduction of the charge pumps 118 (e.g., divide-by-2, divide-by-3, etc.). Alternately or additionally, the charge pumps 118 may operate in an open-loop control mode by which the charge pumps 118 are able to quickly respond to current load steps of the processor cores 106 (e.g., without waiting for feedback).

Another example configuration 710 includes switch-mode power supplies 712-1, 712-2, and 712-3 configured as a multi-phase switch-mode power supply to provide power to IC 104. In this example, the charge pumps 118 of the IC 104 are implemented as separate or dedicated charge pumps with a feedback enabled controller (e.g., FB nodes) that step down power from a common power rail 714 (e.g., internal power rail) to a respective processor core. As shown at 710, each of the charge pumps 118-1, 118-2, 118-3, through 118-n is connected, such as by an input rail, a respective processor core 106-1, 106-2, 106-3, through 106-n, where n is any suitable number (e.g., 4, 8, or 16). As such, these charge pumps 118-1, 118-2, 118-3, through 118-n may enable core-specific power management and control, such as the idling or powering down of individual processor cores 106. For example, the use of multiple, separate charge pumps 118 may provide separate and independent (e.g., isolated) power rails for each processor core or digital load block of an integrated circuit or system-on-chip. In such cases, respective power rails for each processor core or load of the IC 104 may be separate and not connected to others of the independent power rails provided by the charge pumps 118. In some cases, the charge pumps 118 are able to replicate the functionalities of the rail switches 606 (e.g., block head switches), and thus may replace the rail switches to enable an IC to be implemented with fewer devices or less complexity.

In this particular example, the IC 104 includes a multiplexer 716 to provide a feedback signal 718 to respective feedback inputs of the switch-mode power supplies (e.g., PMIC 120). The feedback signal 718 or other feedback signals may be exposed by an electrical contact or pin of the IC 104, which enables coupling to a feedback input pin of a PMIC. The inputs of the multiplexer 716 are connected to respective outputs of the charge pumps 118-1, 118-2, 118-3, through 118-n and may receive an indication of voltage provided to each of the processor cores 106-1, 106-2, 106-3, through 106-n. In some aspects, this enables regulation of voltage on a per-core basis, such as by regulating voltage based on a core voltage or top of a lowest voltage processor core. In such cases, the multiplexer 716 may be used to sample or monitor each core voltage and enable adjustments to voltage of the power provided by the SMPSs such that a desired core voltage is maintained. Due to the fractional voltage reduction provided by the charge pumps 118, a PMIC 120 of the switch-mode power supplies 712-1, 712-2, and 712-3 may regulate a voltage of power provided to the power rail 714 based on a fractional or linear relationship of voltage provided and the fractional voltage reduction of the charge pumps 118.

As shown at 710, each of the charge pumps 118-1, 118-2, 118-3, through 118-n may also include a feedback input through which respective feedback signals 720-1, 720-2, 720-3, through 720-n are received. In some cases, this feedback enables closed-loop operation of individual charge pumps, such as reducing or dropping voltage on idle processor cores. In other cases, the feedback signal may be transmitted, via a switch, to the multiplexer 716 for voltage regulation through the multi-phase switch-mode power supply. In such cases, the charge pumps 118 may operate in an alternate open-loop control mode by which the charge pumps 118 are able to quickly respond to current load steps of the processor cores 106 (e.g., without waiting for feedback).

Techniques of Power Regulation with Charge Pumps

The following techniques of power regulation with charge pumps may be implemented using any of the previously described elements of the example environment, circuits, or components. Reference to elements, such as the charge pumps 118 or the PMIC 120, is made by example only and is not intended to limit the ways in which the techniques can be implemented. The techniques are described with reference to example methods illustrated in FIGS. 8, 9, and 12, which are depicted as respective sets of operations or acts that may be performed by entities described herein. The operations described herein may be performed using any suitable circuitry or component, which may provide means for implementing one or more of the operations. The depicted sets of operations illustrate a few of the many ways in which the techniques may be implemented. As such, operations of a method may be repeated, combined, separated, omitted, performed in alternate orders, performed concurrently, or used in conjunction with another method or operations thereof.

Figure 8:
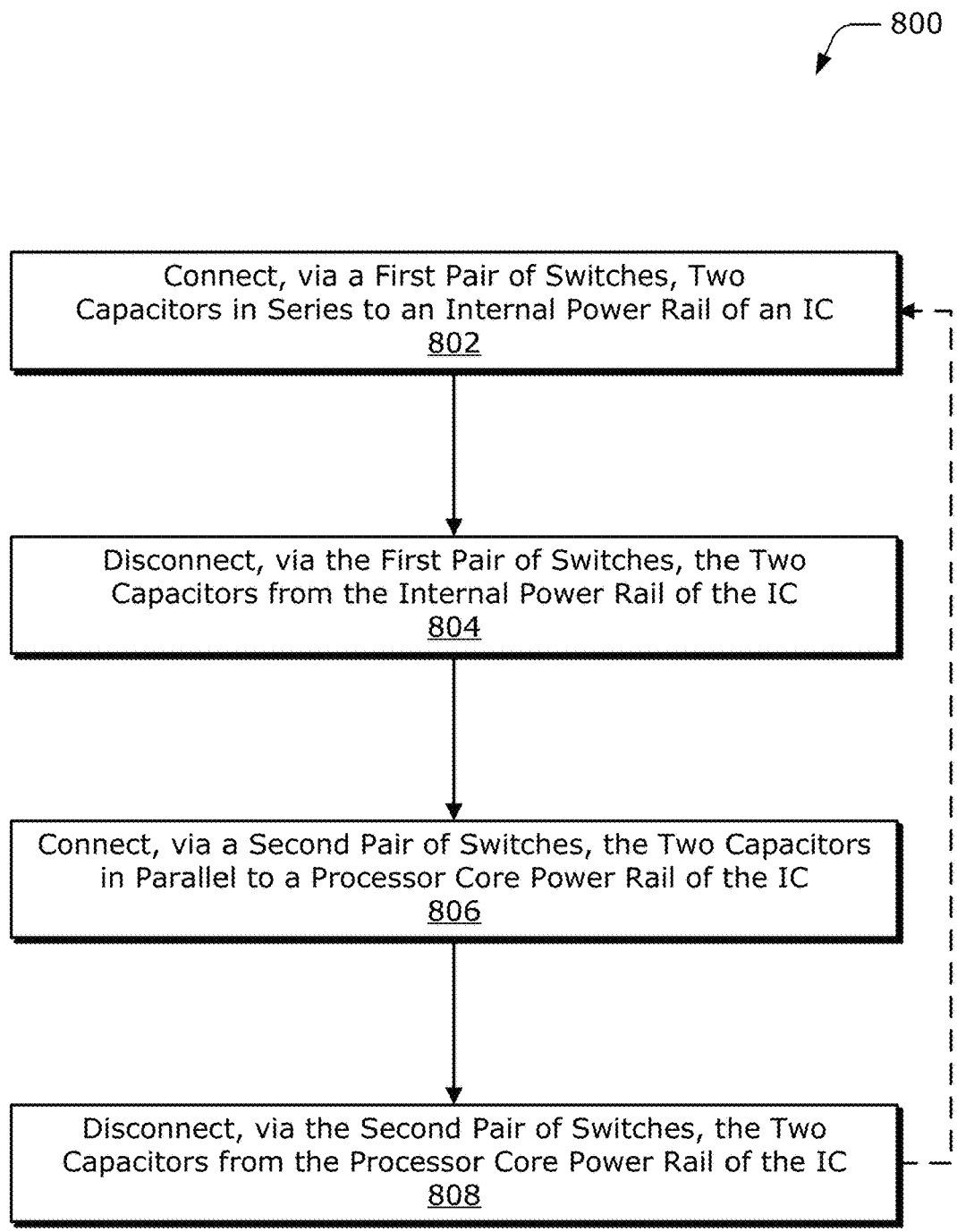
FIG. 8 illustrates an example method for providing power to a processor core of an integrated circuit in accordance with one or more aspects.

FIG. 8 illustrates an example method 800 for providing power to processor cores of an integrated circuit, including operations performed by the charge pumps 118.

At 802, two capacitors of a charge pump are connected, via a first pair of switches, in series to a power rail of an IC. The first pair of switches (e.g., switches 504, 512) may connect a first terminal of a flying capacitor (e.g., capacitor 518) of the charge pump to the power rail (e.g., power rail 508) and a second terminal of the flying capacitor to a reservoir capacitor (e.g., capacitor 520). This may be effective to charge the flying capacitor and reservoir capacitor to approximately the voltage of the power rail. In some cases, the charge pump is embedded in an integrated circuit (e.g., IC 104) and the power rail is connected to a switch-mode power supply (e.g., SMPS 202) from which the integrated circuit receives power. In such cases, the switch-mode power supply may be configured to provide the power at a voltage that is a multiple of a processor core voltage of the integrated circuit.

At 804, the two capacitors of the charge pump are disconnected, via the first pair of switches, from the power rail of the IC. The two capacitors may be disconnected after being charged to approximately a voltage of the power rail. In some cases, the first pair of switches is controlled by a clock or switching signal that has a frequency of approximately 200 MHz to 600 MHz. In such cases, respective capacitance values of the capacitors may be configured such that the capacitors can charge to approximately a voltage of the power rail while the first pair of switches operate at a particular frequency (e.g., 500 MHz).

At 806, the two capacitors of the charge pump are connected, via a second pair of switches, in parallel to a processor core power rail of the IC. The second pair of switches (e.g., switches 506, 514) may connect the first terminal of the flying capacitor of the charge pump to the reservoir capacitor and the second terminal of the flying capacitor to a lower potential. Connecting the two capacitors in parallel applies a charge stored by the capacitors to the processor core power rail (e.g., rail 510) of the IC, thereby providing power to the processor core (e.g., core 106-n). From charging the capacitors in series to discharging the capacitors in parallel, a voltage of the power applied to the processor core power rail is reduced by approximately half. Alternately, the voltage may be reduced by a different fractional ratio when the charge pump is implemented with a different topology, such as a divide-by-three, divide-by-four, or divide-by-N topology.

At 808, the two capacitors of the charge pump are disconnected, via the second pair of switches, from the processor core power rail of the IC. The two capacitors may be disconnected after being substantially discharged to the processor core power rail to provide power to a processor core. In some cases, the second pair of switches is controlled by a clock or switching signal that has a frequency of approximately 200 MHz to 600 MHz. This clock or switch signal may be a complementary signal to a signal controlling the first pair of switches. Alternately or additionally, respective capacitance values of the capacitors may be configured such that the capacitors can discharge substantially to the processor core power rail while the second pair of switches operate at a particular frequency (e.g., 500 MHz). From operation 808, the method 800 may return to operation 802 to recharge the two capacitors and continue the operational cycle of the charge pump.

Figure 9:
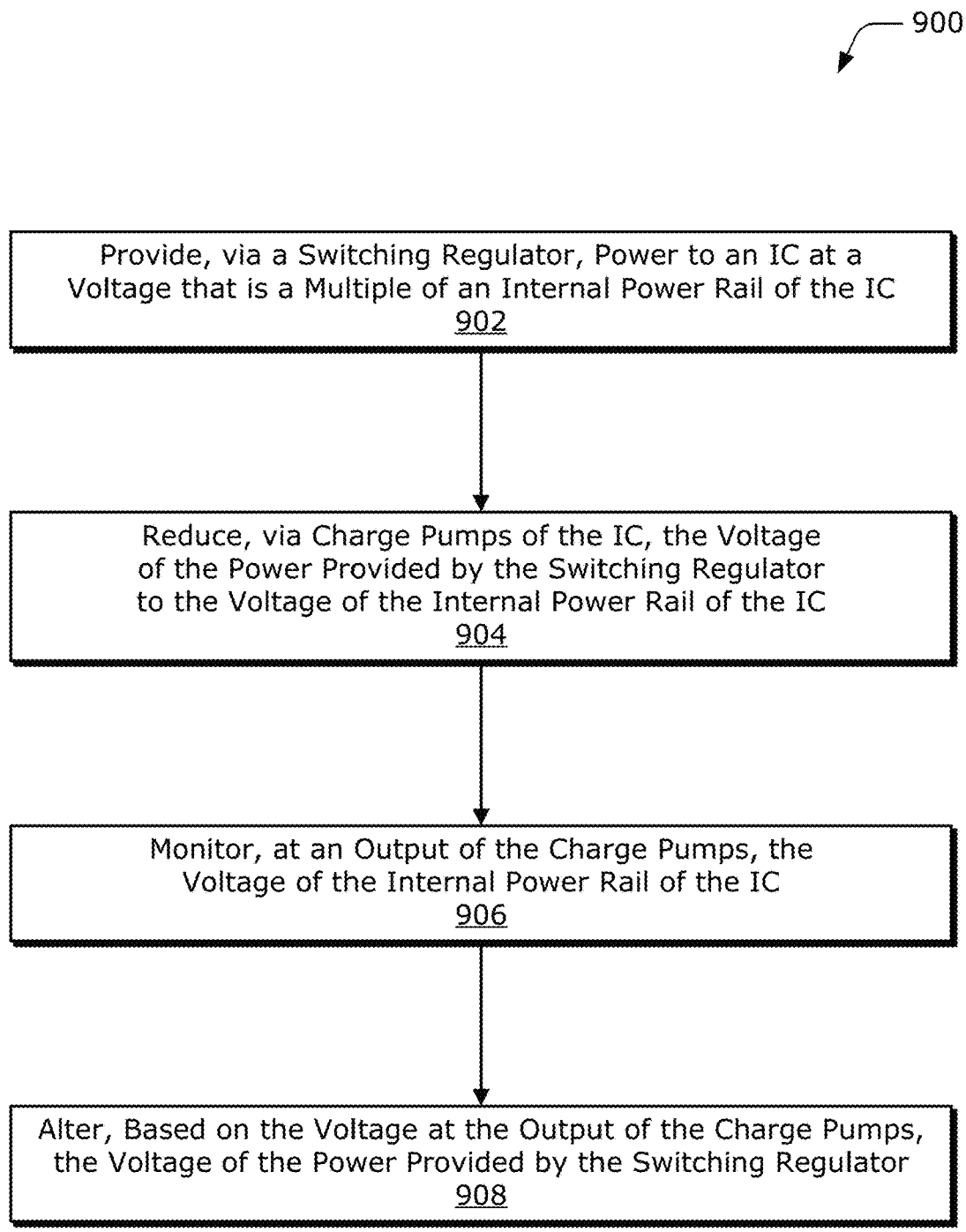
FIG. 9 illustrates an example method for providing power to an internal power rail of an integrated circuit with embedded charge pumps.

FIG. 9 illustrates an example method 900 for providing power to an internal power rail of an integrated circuit with embedded charge pumps, including operations performed by the charge pumps 118 and PMIC 120.

At 902, power is provided, via a switching regulator (e.g., SMPS 202), to an IC (e.g., IC 104) at a voltage that is a multiple of a voltage of an internal power rail of the IC. The switching regulator can be implemented as a single phase switch-mode power supply or a multi-phase switch mode power supply. In some cases, the switching regulator regulates voltage based on feedback indicating a voltage of the internal power rail of the IC. The power can be provided to the IC at any suitable multiple, such as twice or three times the voltage of the internal power rail of the IC. By so doing, current-related losses ($I^2 \times R$) associated with distributing the power to the IC can be reduced.

At 904, the voltage of the power provided is reduced, via charge pumps (e.g., charge pumps 118) of the IC, to the voltage of the internal rail of the IC. The charge pumps may be configured with any suitable topology, such as divide-by-two, divide-by-three, and so on. In some cases, the charge pumps are implemented with on-die capacitors, which provides capacitors with low equivalent series inductance and enables the charge pumps to efficiently convert power for high performance digital loads, such as processor cores of the IC. Alternately or additionally, the charge pumps are operated at high frequencies, such as from 200 MHz to 500 MHz, which may enable the charge pumps to operate with low output impedance or respond more-quickly to transient load steps than conventional power supply architectures.

At 906, the voltage of the internal rail is monitored at an output of the charge pumps. The voltage may be monitored by a power management IC (e.g., PMIC 120) or controller associated with the switching regulator. For example, the charge pumps may operate in an open-loop mode while voltage is monitored by a power management IC of the switching regulator. Alternately or additionally, the charge pumps can operate in a closed-loop mode that is managed by a charge pump controller (e.g., controller 524) of the IC. Alternately, a voltage of the IC can be monitored at an input of the charge pumps or a power input node of the IC, though this voltage may not be fractionally reduced by the charge pumps.

At 908, the voltage of the power provided by the switching regulator is altered based on the voltage monitored at the output of the charge pumps. The output of the charge pumps may be connected to a shared processor core power rail or dedicated power rails for each processor core of the IC. As such, the voltage of the power provided may be altered based on a common processor core voltage or a voltage of a lowest-voltage processor core of the IC. Due to the fractional voltage reduction provided by the charge pumps, the switching regulator may regulate the voltage of the IC's internal power rail based on a fractional relationship of voltage provided and the fractional voltage reduction provided by the charge pumps. By reducing the voltage of the power provided by the switching regulator, the embedded charge pumps may enable the power to be provided at a higher voltage and lower current, thereby reducing current-related losses.

Figure 10:
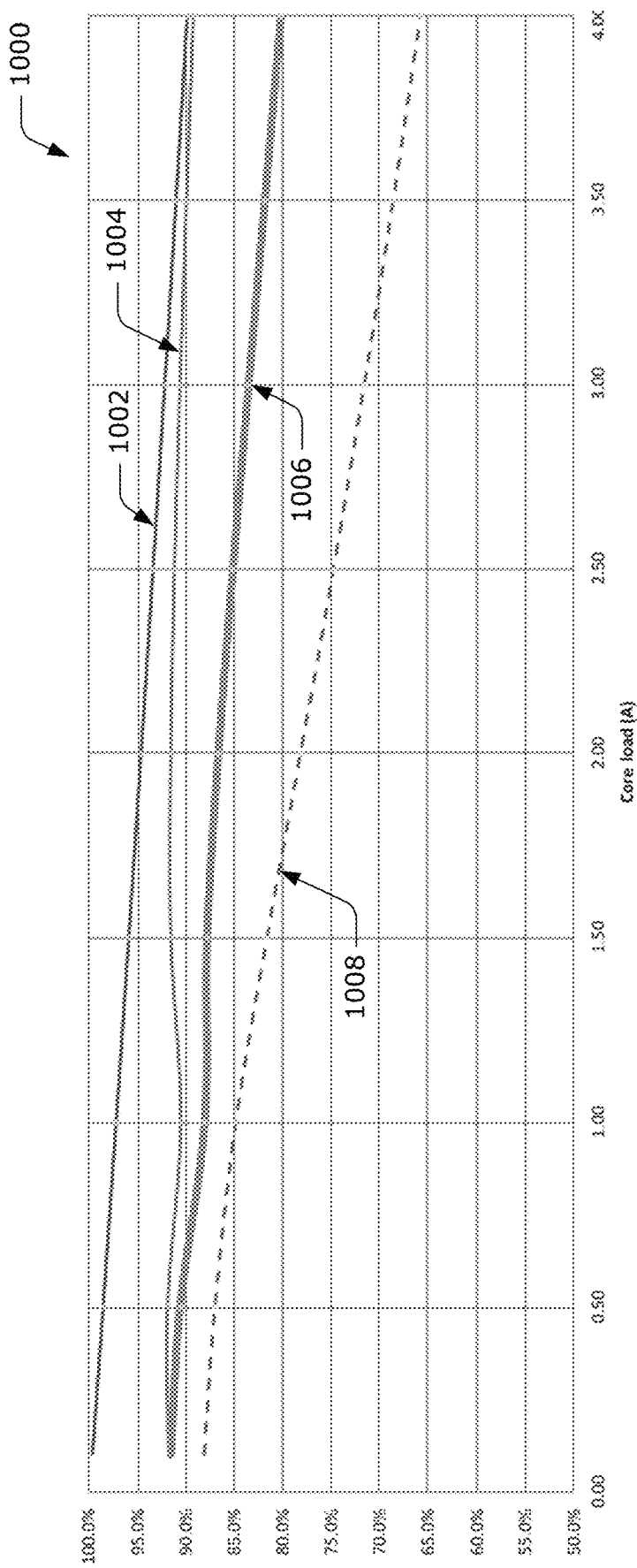
FIG. 10 depicts a graph of example efficiency improvement provided by power regulation with charge pumps.

In some aspects, power regulation with charge pumps (e.g., two-stage power regulation) combines this reduction in current-related losses and an efficiency of the charge pumps to improve overall power regulation and distribution within a system. By way of example, consider FIG. 10 which depicts a graph 1000 of an example of efficiency improvement provided by power regulation with charge pumps. Here, an efficiency of the charge pumps 1002 and an efficiency of a switching regulator 1004 operating at lower current combine to provide a total efficiency 1006. As shown by graph 1000, the total efficiency of the power regulation with charge pumps exceeds an efficiency of a conventional switching regulator 1008 over a wide range of current loading. In particular, power regulation with charge pumps (e.g., embedded) may offer an efficiency improvement of approximately 13% at higher current loads. In other embodiments, greater or less efficiency improvement is realized.

Figure 11:
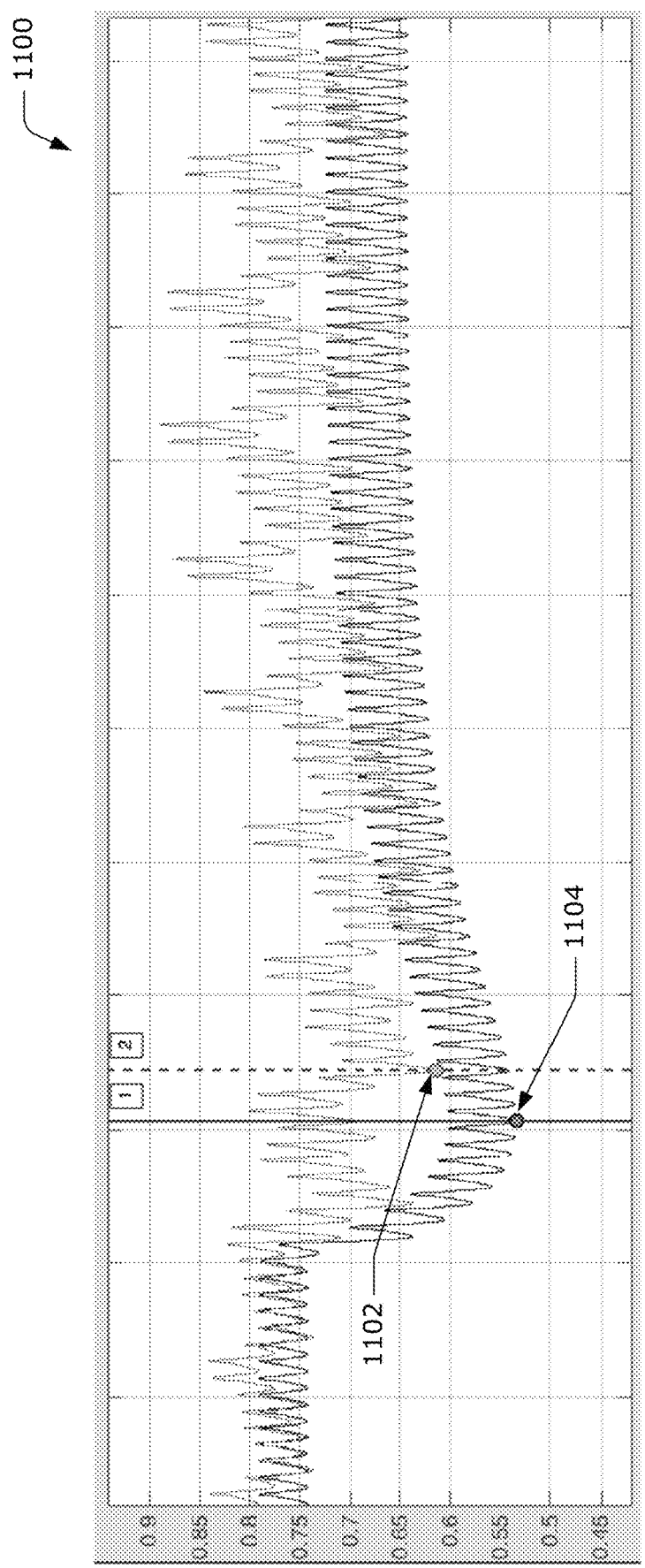
FIG. 11 depicts a graph of example load step response improvement provided by power regulation with charge pumps.

Additionally, power regulation with charge pumps may provide improved response to transient load or current steps, an example of which is depicted by graph 1100 of FIG. 11. Here, the graph 1100 shows voltage drop responsive to a two amp per processor load step. In response to this load step, the charge pumps of the IC in this example are able to quickly provide additional current and the core voltage 1102 drops to approximately 0.61 volts, which is approximately an 80 millivolt (15%) improvement over a typical voltage drop to 0.53 volts associated with a switching regulator.

Figure 12:
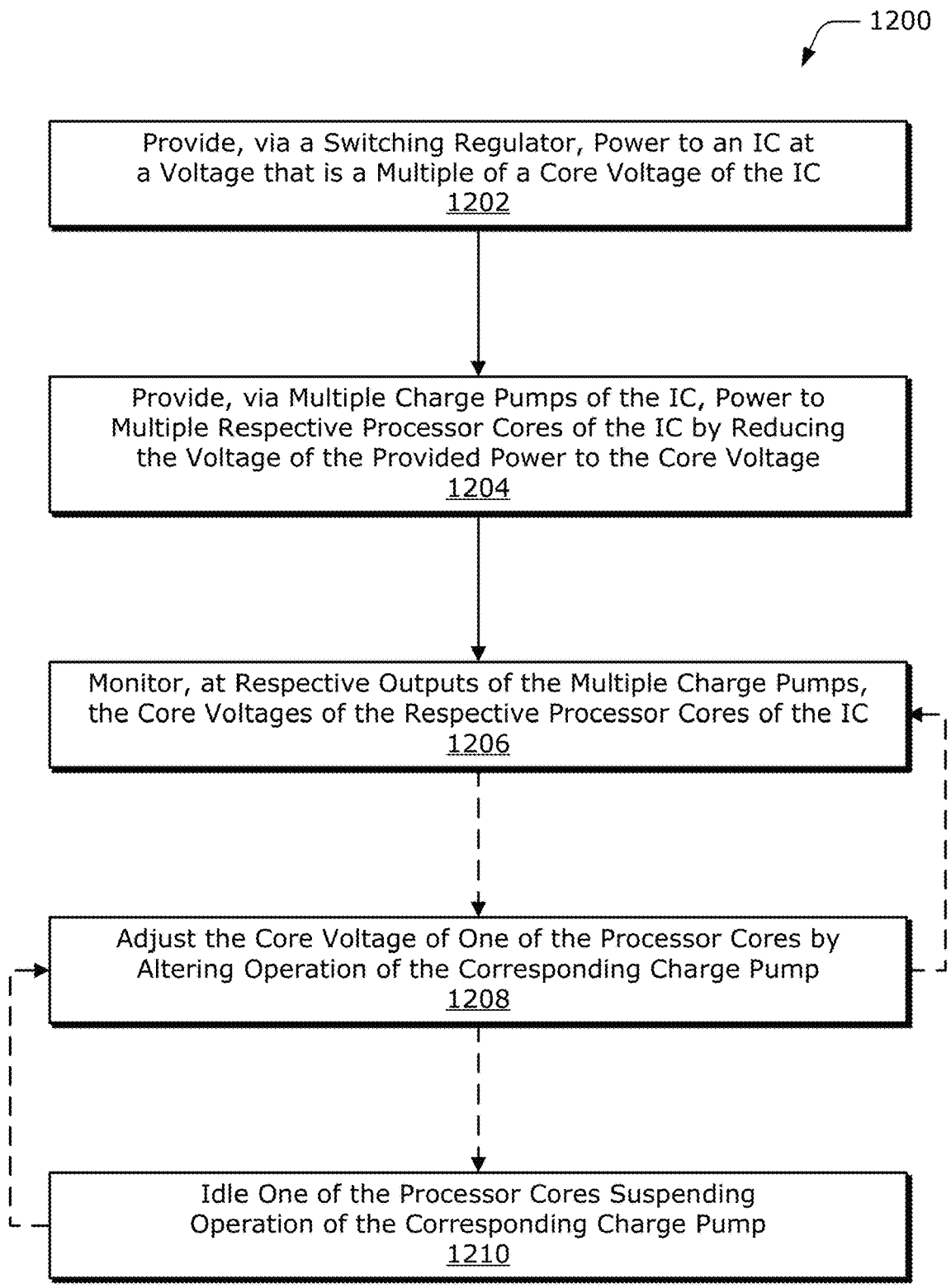
FIG. 12 illustrates an example method for adjusting processor core voltage in accordance with one or more aspects.

FIG. 12 illustrates an example method 1200 for providing power to processor cores of an integrated circuit, including operations performed by the charge pumps 118 and PMIC 120.

At 1202, power is provided, via a switching regulator (e.g., SMPS 202), to an IC (e.g., IC 104) at a voltage that is a multiple of a core voltage of the IC. The switching regulator can be implemented as a single phase switch-mode power supply or a multi-phase switch mode power supply. In some cases, the switching regulator regulates voltage based on feedback indicating a voltage of the internal power rail of the IC. The power can be provided to the IC at any suitable multiple, such as twice or three times the voltage of the internal power rail of the IC. By so doing, current-related losses ($I^2 \times R$) associated with distributing the power to the IC can be reduced.

At 1204, power is provided, via multiple charge pumps (e.g., charge pumps 118) of the IC, to multiple respective processor cores (e.g., cores 106) of the IC by reducing the voltage of the power to the core voltage. The charge pumps may be configured with any suitable topology, such as divide-by-two, divide-by-three, and so on. In some cases, the charge pumps are implemented with on-die capacitors, which provides capacitors with low equivalent series inductance and enables the charge pumps to efficiently regulate power for high performance digital loads.

At 1206, the core voltages of the multiple processor cores are monitored at respective outputs of the multiple charge pumps. The voltage may be monitored by a power management IC (e.g., PMIC 120) or controller associated with the charge pumps (e.g., controller 524). For example, the charge pumps can operate in a closed-loop mode that is managed by a charge pump controller within the IC. In some cases, multiple charge pump controllers (e.g., dedicated controllers) monitor voltage at an output of a respective charge pump with which the controller is associated. In other cases, a charge pump controller may receive indications of the core voltages via a multiplexer (e.g., multiplexer 706, 716) having inputs connected to the respective outputs of the multiple charge pumps.

Optionally at 1208, the core voltage of one of the processor cores is adjusted by altering operation of the corresponding charge pump. In some cases, the core voltage is lowered when the processor core is throttled down or operating at a reduced frequency. The core voltage may be adjusted by altering a frequency or duty cycle at which the charge pump operates. From operation 1208, the method 1200 may return to operation 1206 to resume monitoring core voltages or proceed to operation 1210.

Optionally at 1210, one of the processor cores is idled by suspending operation of the corresponding charge pump. The charge pump may be used to disconnect the processor core from a power rail of the IC while the core is idle or in a lower power state. In some cases, one or more of the IC's multiple processor cores may be idled or placed in a lower power state to conserve battery power or extend a runtime of a device in which the IC is embodied. From operation 1210, the method 1200 may return to operation 1208 when the processor core resumes operation or moves to a higher state of operation.

Although subject matter has been described in language specific to structural features or methodological operations, it is to be understood that the subject matter defined in the appended claims is not necessarily limited to the specific features or operations described above, including not necessarily being limited to the organizations in which features are arranged or the orders in which operations are performed.

What is claimed is:

1. An integrated circuit comprising:
   a power input connected to an internal power rail of the integrated circuit;
   multiple processor cores that include a first processor core and a second processor core;
   multiple charge pumps that include:
   a first charge pump coupled between the internal power rail of the integrated circuit and a first input power rail of the first processor core; and
   a second charge pump coupled between the internal power rail of the integrated circuit and a second input power rail of the second processor core, the second input power rail of the second processor core isolated from the first input power rail of the first processor core; and a signal line coupled from the internal power rail of the integrated circuit to an external contact of the integrated circuit.

2. The integrated circuit as recited in claim 1, wherein:
the integrated circuit is disposed on an integrated circuit die; and
at least one of the first charge pump or the second charge pump is implemented with capacitors that are embodied on the integrated circuit die.

3. The integrated circuit as recited in claim 2, wherein the capacitors of the first charge pump or the second charge pump are implemented as at least one of:
metal-insulator-metal capacitors;
metal-on-metal capacitors; or
metal-oxide-metal capacitors.

4. The integrated circuit as recited in claim 2, wherein a capacitance value of one or more of the capacitors is within a range of approximately five nanofarads to 50 nanofarads.

5. The integrated circuit as recited in claim 1, wherein the first charge pump or the second charge pump comprises one of:
a divide-by-two charge pump;
a divide-by-three charge pump; or
a divide-by-four charge pump.

6. The integrated circuit as recited in claim 1, wherein the integrated circuit is implemented without:
a power control switch disposed between the first charge pump and the first input power rail of the first processor core; or
a power control switch disposed between the second charge pump and the second input power rail of the second processor core.

7. The integrated circuit as recited in claim 1, further comprising a charge pump controller that includes:
an input coupled to the first input power rail of the first processor core or the second input power rail of the second processor core; and
an output coupled to first switch devices of the first charge pump or second switch devices of the second charge pump.

8. The integrated circuit as recited in claim 1, wherein switch devices of the first charge pump or the second charge pump are connected to a clock source of the integrated circuit that is configured to operate at a frequency of at least 200 megahertz.

9. The integrated circuit as recited in claim 1, wherein:
the first processor core or the second processor core is implemented with low-voltage switching devices that are configured to operate from approximately 0.5 volts to 1.5 volts; and
the first charge pump or the second charge pump is implemented with other low-voltage switching devices that are configured operate from approximately 0.5 volts to 1.5 volts.

10. The integrated circuit as recited in claim 1, wherein the integrated circuit is implemented as a system-on-chip, an application-specific integrated circuit, an application processor, a graphics processor, a memory controller, or a modem.

11. A printed circuit board assembly (PCBA) comprising:
a switching regulator that includes:
a first switch coupled between a power rail of the PCBA and a first terminal of an inductor of the switching regulator;
a second switch coupled between a lower potential of the PCBA and the first terminal of the inductor of the switching regulator; and
a capacitor connected between a second terminal of the inductor and the lower potential of the PCBA; and
an integrated circuit that includes:
an internal power rail coupled, via a power input node, to the second terminal of the inductor of the switching regulator;
multiple processor cores that include a first processor core and a second processor core; and
multiple charge pumps that include:
a first charge pump coupled between the internal power rail of the integrated circuit and a first input power rail of the first processor core; and
a second charge pump coupled between the internal power rail of the integrated circuit and a second input power rail of the second processor core, the second input power rail of the second processor core not coupled to the first input power rail of the first processor core,
wherein a first frequency or first duty cycle at which the first charge pump is configured to operate is different from a second frequency or second duty cycle at which the second charge pump is configured to operate.

12. The printed circuit board assembly as recited in claim 11, wherein:
the first charge pump is connected directly from the internal power rail of the integrated circuit to the first input power rail of the first processor core; and
the second charge pump is connected directly from the internal power rail of the integrated circuit to the second input power rail of the second processor core.

13. The printed circuit board assembly as recited in claim 11, wherein:
the integrated circuit is disposed on an integrated circuit die; and
the first charge pump or the second charge pump is implemented with capacitors that are embodied on the integrated circuit die.

14. The printed circuit board assembly as recited in claim 13, wherein a capacitance value of one or more of the capacitors is within a range of approximately five nanofarads to 50 nanofarads.

15. The printed circuit board assembly as recited in claim 13, wherein the capacitors of the first charge pump or the capacitors of the second charge pump are implemented as metal-insulator-metal capacitors, metal-on-metal capacitors, or metal-oxide-metal capacitors.

16. The printed circuit board assembly as recited in claim 11, wherein a first voltage of the first input power rail of the first processor core is different from a second voltage of the second input power rail of the second processor core.

17. The printed circuit board assembly as recited in claim 11, wherein:
the first processor core comprises a first digital load of the integrated circuit;
the second processor core comprises a second digital load of the integrated circuit; and
the integrated circuit further comprises:
a third digital load; and
a third charge pump coupled between the internal power rail of the integrated circuit and an input power rail of the third digital load of the integrated circuit.

18. The printed circuit board assembly as recited in claim 17, wherein the third digital load of the integrated circuit comprises one of a third processor core, a graphics processing unit, a digital signal processor, a baseband modem, a communications processor, a memory controller, or a memory module.

19. The printed circuit board assembly as recited in claim 11, wherein the printed circuit board assembly is embodied in one of a smart-phone, set-top box, cellular base station, access point, cellular phone, gaming device, navigation device, laptop computer, tablet computer, smart appliance, or vehicle-based communication system.

20. The printed circuit board assembly as recited in claim 11, wherein the first input power rail is coupled to an external contact of the integrated circuit.

21. The printed circuit board assembly as recited in claim 20, wherein the first input power rail is further coupled to a feedback input of the first charge pump.

22. The printed circuit board assembly as recited in claim 20, wherein the switching regulator comprises a multi-phase switching regulator having a plurality of switch stacks, and wherein the external contact is coupled to respective inputs of the plurality of switch stacks.

23. An integrated circuit comprising:
a power input connected to an internal power rail of the integrated circuit;
multiple digital loads that each have a respective input power rail that is isolated from the input power rails of others of the multiple digital loads; and
multiple charge pumps that are each coupled between the internal power rail of the integrated circuit and a respective one of the input power rails, each of the multiple charge pumps comprising:
a first pair of switches coupled in series between the internal power rail of the integrated circuit and the respective input power rail;
a second pair of switches coupled in series between the respective input power rail and a lower potential;
a first capacitor coupled from a common node of the first pair of switches to a common node of the second pair of switches; and
a second capacitor coupled between the respective input power rail and the lower potential.

24. The integrated circuit as recited in claim 23, further comprising a signal line coupled between at least one of the respective input power rails and an external signal contact of the integrated circuit.

25. The integrated circuit as recited in claim 23, further comprising multiple signal lines coupled between at least two respective input power rails and at least two inputs of a multiplexer that has an output coupled to an external signal contact of the integrated circuit.

26. The integrated circuit as recited in claim 23, wherein one or more of the multiple charge pumps of the integrated circuit operate in an open-loop control mode.

27. The integrated circuit as recited in claim 23, further comprising a charge pump controller comprising:
an input coupled to at least one of the respective input power rails;
a first output coupled to gates of the first pair of switches coupled to the at least one respective input power rail; and
a second output coupled to gates of the second pair of the switches coupled to the at least one respective input power rail.

28. An integrated circuit comprising:
a power input connected to an internal power rail of the integrated circuit;
multiple processor cores that include a first processor core and a second processor core;
multiple charge pumps that include:
a first charge pump coupled between the internal power rail of the integrated circuit and a first input power rail of the first processor core;
a second charge pump coupled between the internal power rail of the integrated circuit and a second input power rail of the second processor core;
means for monitoring a voltage of the first input power rail of the first processor core; and
means for altering, based on the voltage, operation of the first charge pump or the second charge pump to adjust the voltage of the first input power rail or the second input power rail; and
means for monitoring an operative state of the first processor core or the second processor core; and
means for suspending, based on the operative state, operation of the first charge pump or the second charge pump to idle the first processor core or the second processor core.

29. The integrated circuit as recited in claim 28, further comprising:
means for monitoring an operative state of the first processor core or the second processor core; and
means for altering, based on the operative state, operation of the first charge pump or the second charge pump to affect power provided to the first processor core or the second processor core.

30. The integrated circuit as recited in claim 28, wherein the means for monitoring the voltage include multiplexing means for monitoring respective voltages of the first input power rail of the first processor core and the second input power rail of the second processor core.

* * * * *